(12) United States Patent
Hwang et al.

(10) Patent No.: US 7,689,852 B2
(45) Date of Patent: Mar. 30, 2010

(54) METHOD AND SYSTEM FOR PROVIDING POWER MANAGEMENT FOR AN INTEGRATED GIGABIT ETHERNET CONTROLLER

(75) Inventors: Andrew S. Hwang, Redondo Beach, CA (US); Augustine Jian Heng Kuo, Berkeley, CA (US); Michael James Hurt, Lake Forest, CA (US)

(73) Assignee: Broadcom Corporation

( * ) Notice: Subject to any disclaimer, the term of this patent is extended or adjusted under 35 U.S.C. 154(b) by 1599 days.

(21) Appl. No.: 10/887,068

(22) Filed: Jul. 8, 2004

(65) Prior Publication Data

US 2005/0060587 A1 Mar. 17, 2005

Related U.S. Application Data

(60) Provisional application No. 60/502,790, filed on Sep. 12, 2003.

(51) Int. Cl.
G06F 1/28 (2006.01)
(52) U.S. Cl. ....................... 713/340; 713/300
(58) Field of Classification Search ................. 713/300, 713/340
See application file for complete search history.

(56) References Cited

U.S. PATENT DOCUMENTS

| 4,069,452 | A | * | 1/1978 | Conway et al. | .......... 324/103 P |
|---|---|---|---|---|---|
| 4,531,826 | A | * | 7/1985 | Stoughton et al. | .............. 399/80 |
| 4,978,866 | A | * | 12/1990 | Kuhn | .......... 327/131 |
| 5,072,171 | A | * | 12/1991 | Eng | .......... 323/283 |
| H001489 | H | * | 9/1995 | Doan et al. | .................. 702/122 |
| 6,268,666 | B1 | * | 7/2001 | Bhowmik | .................... 307/72 |
| 2001/0017485 | A1 | * | 8/2001 | Yoo | ........................... 307/66 |
| 2002/0145895 | A1 | * | 10/2002 | Liu | ............................. 363/65 |
| 2003/0014627 | A1 | * | 1/2003 | Krishna et al. | .............. 713/153 |
| 2003/0028852 | A1 | * | 2/2003 | Thurman et al. | .............. 716/12 |
| 2003/0066759 | A1 | * | 4/2003 | Hardee et al. | ................ 205/565 |

* cited by examiner

*Primary Examiner*—Tse Chen
(74) *Attorney, Agent, or Firm*—McAndrews, Held & Malloy, Ltd.

(57) ABSTRACT

Certain aspects of a system for controlling power for a network interface controller device may comprise a precision voltage comparator that may instantaneously detect ramp up of a main voltage corresponding to a main voltage source in order to control the network interface controller device. A power monitor may detect when a threshold voltage of the main voltage is reached during the ramp up. A main voltage source switch and an auxiliary voltage source switch may switch an output from an auxiliary voltage to the main voltage source without the switches being simultaneously on. The power monitor may determine whether the main voltage is ramping up in excess of a determined rate and if so, may decrease a rate at which the main voltage ramps up. A current limiter and/or the power monitor may monitor and limit an inrush current caused during main voltage ramp up.

59 Claims, 14 Drawing Sheets

(All Voltages Are Shown in VDC))

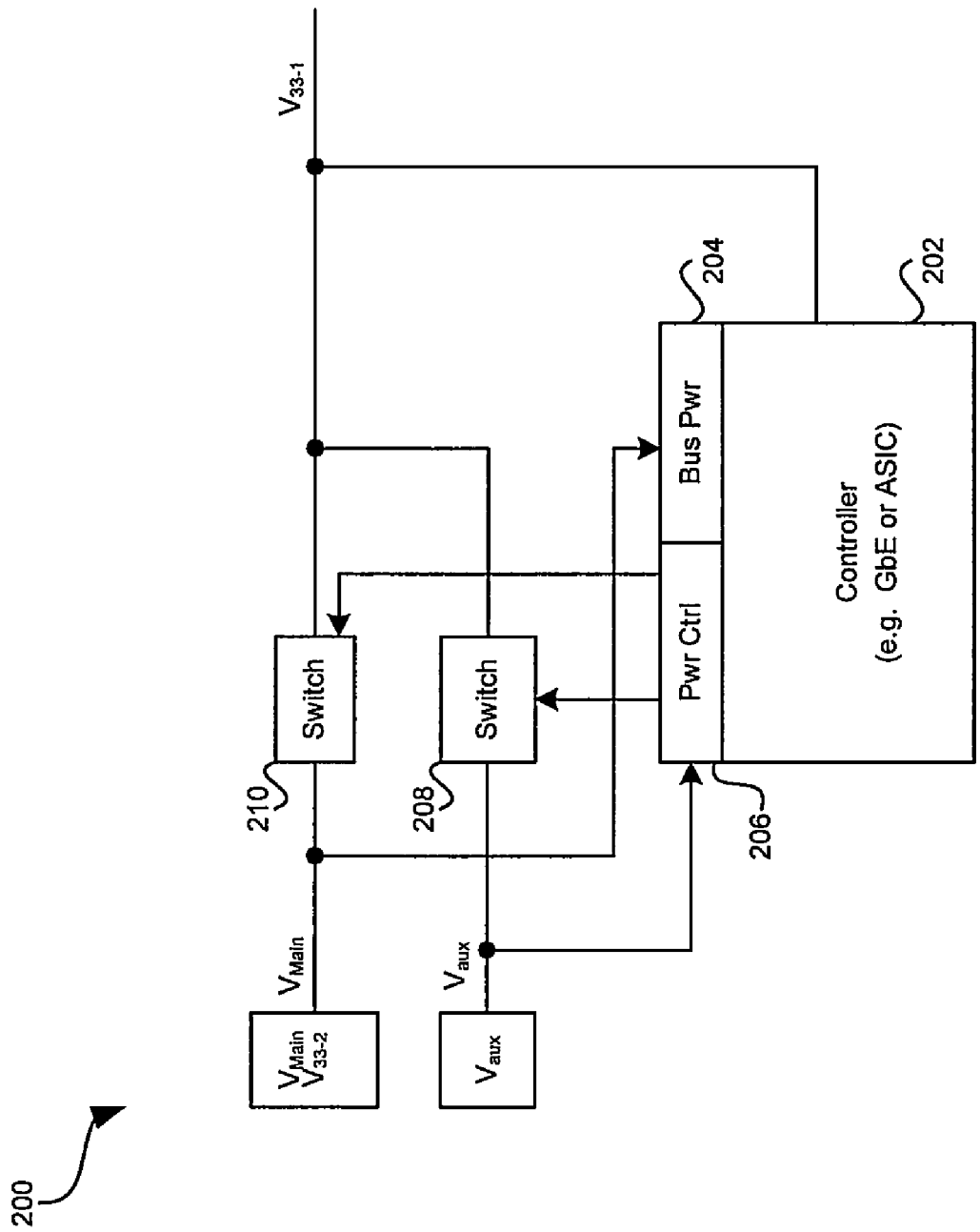
FIG. 2  (All Voltages Are Shown in VDC)

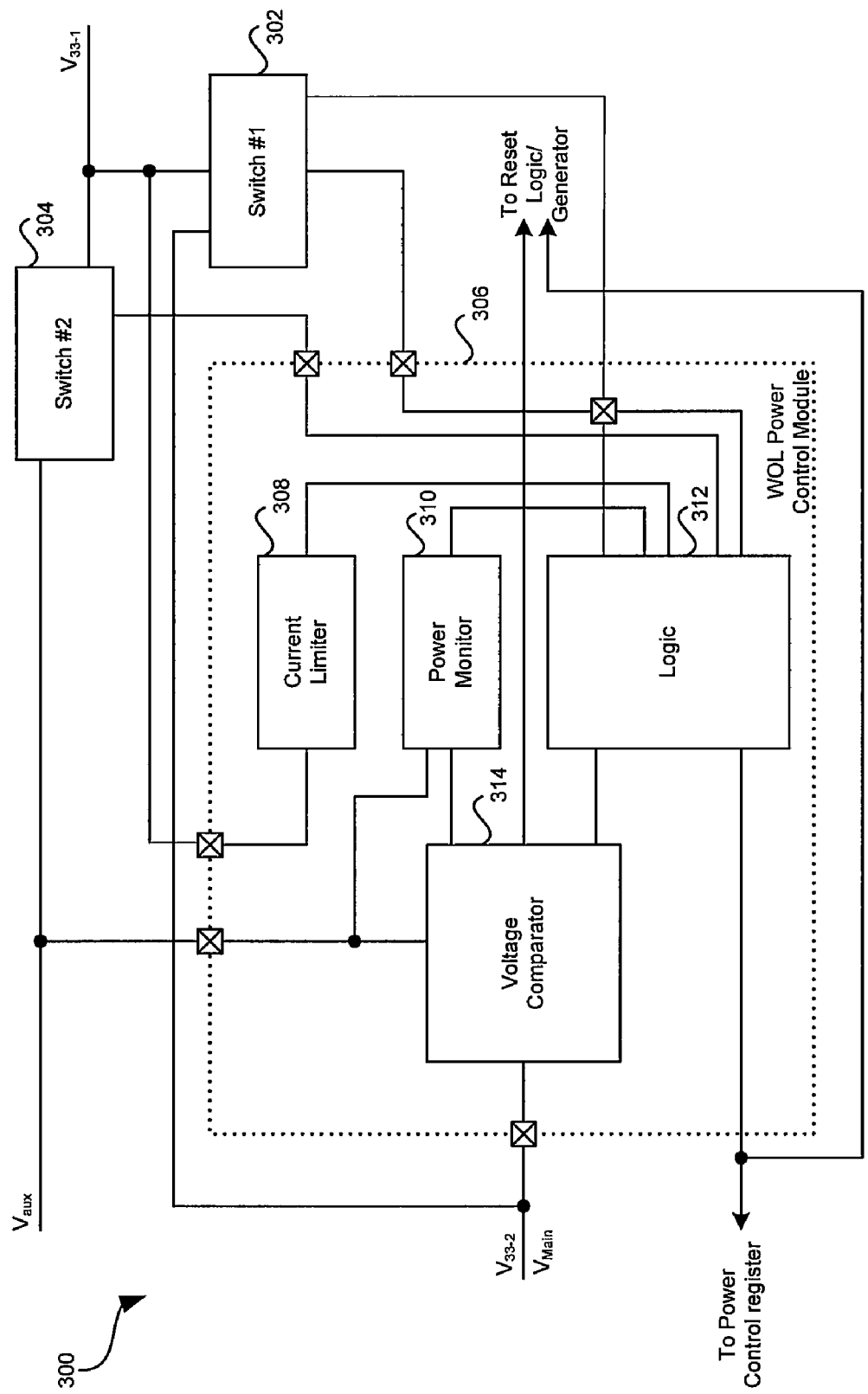
FIG. 3A (All Voltages Are Shown in VDC))

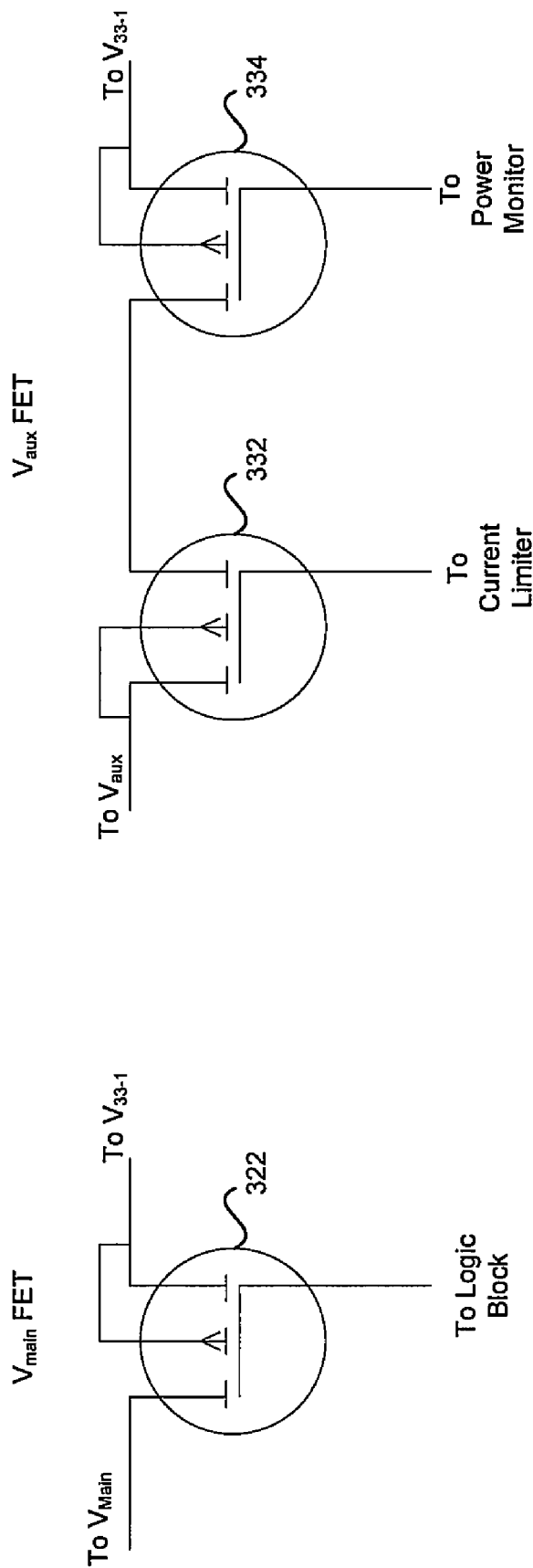

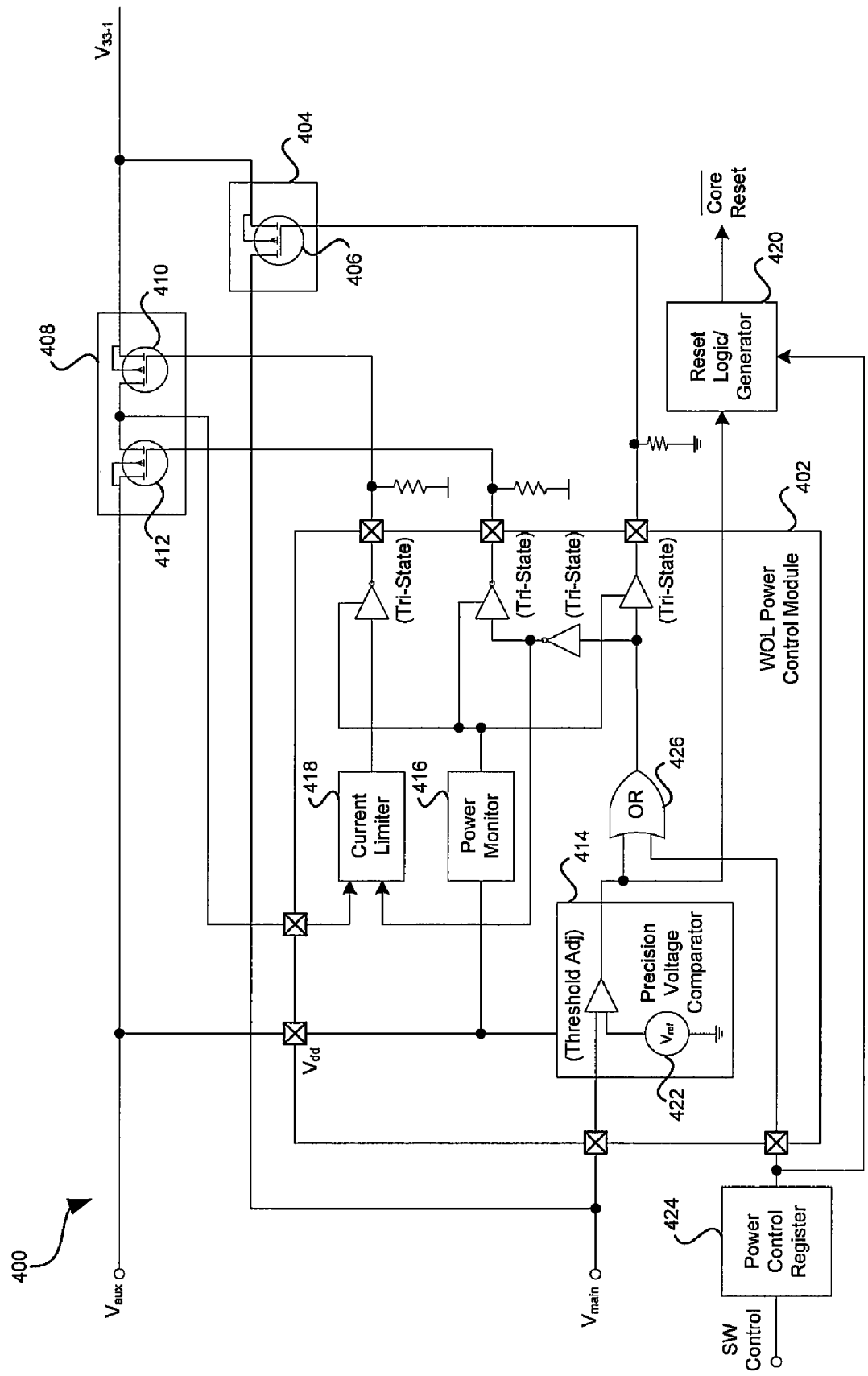
FIG. 4A (All Voltages Are Shown in VDC))

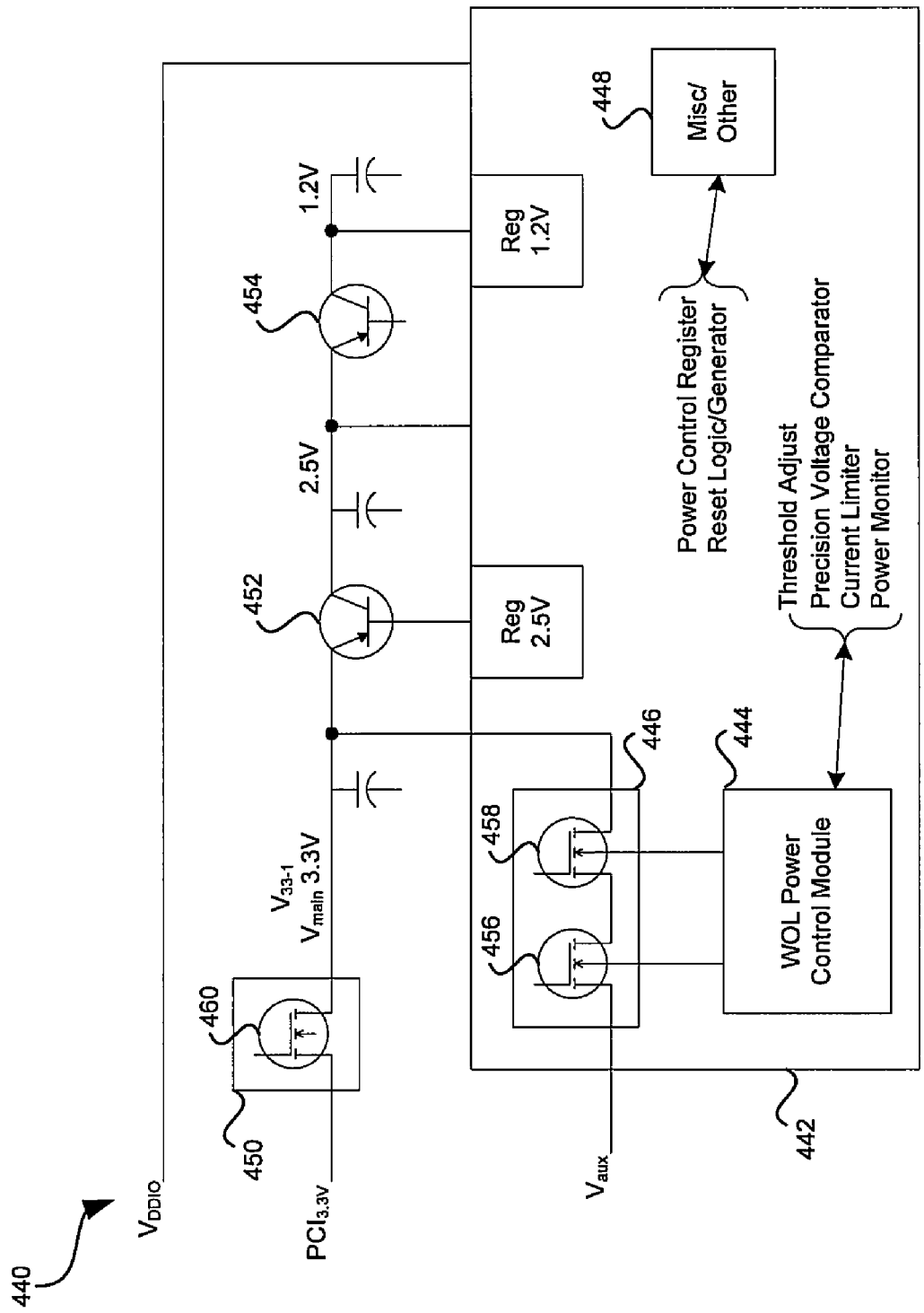
FIG. 4B (All Voltages Are Shown in VDC))

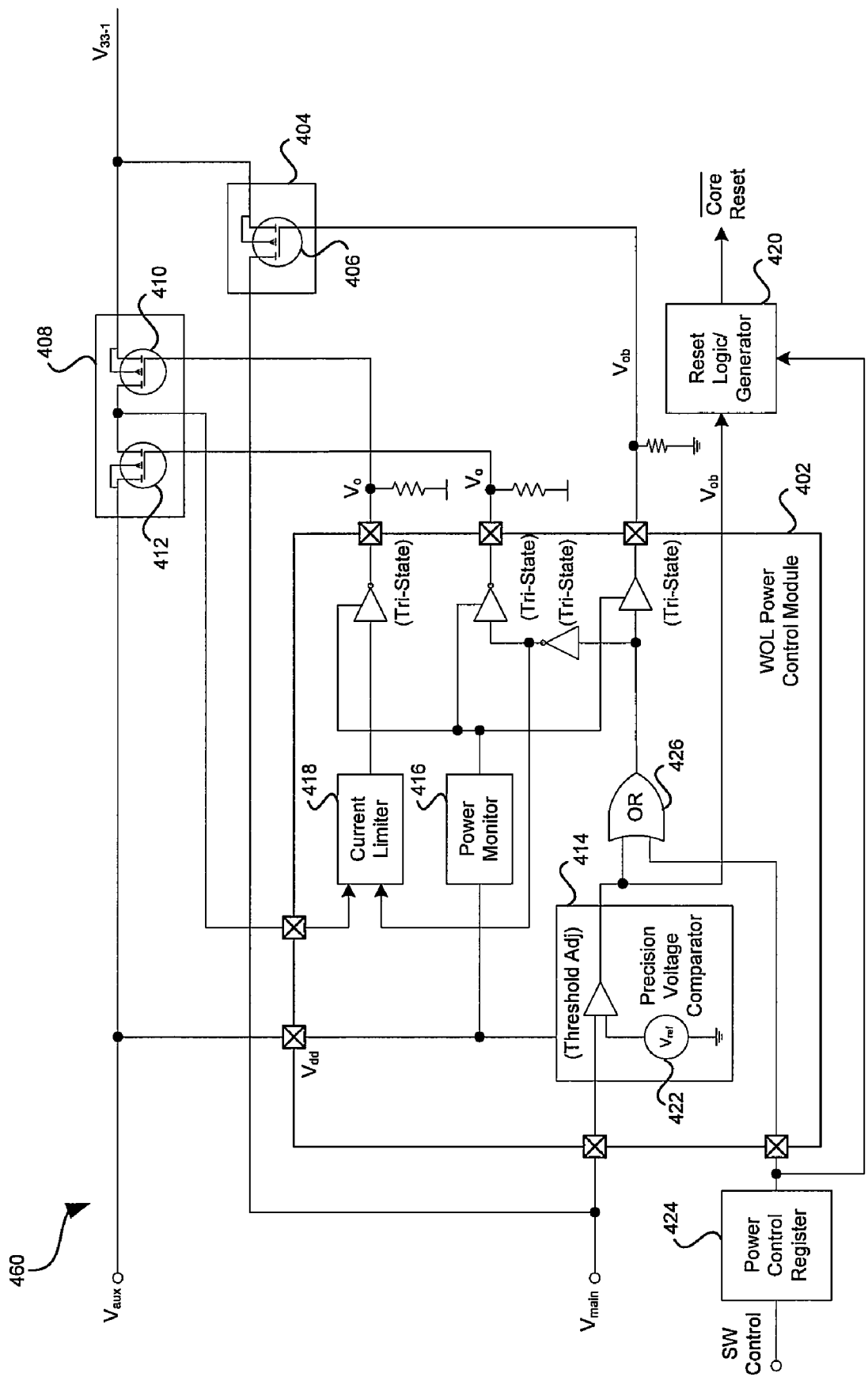
FIG. 4C (All Voltages Are Shown in VDC))

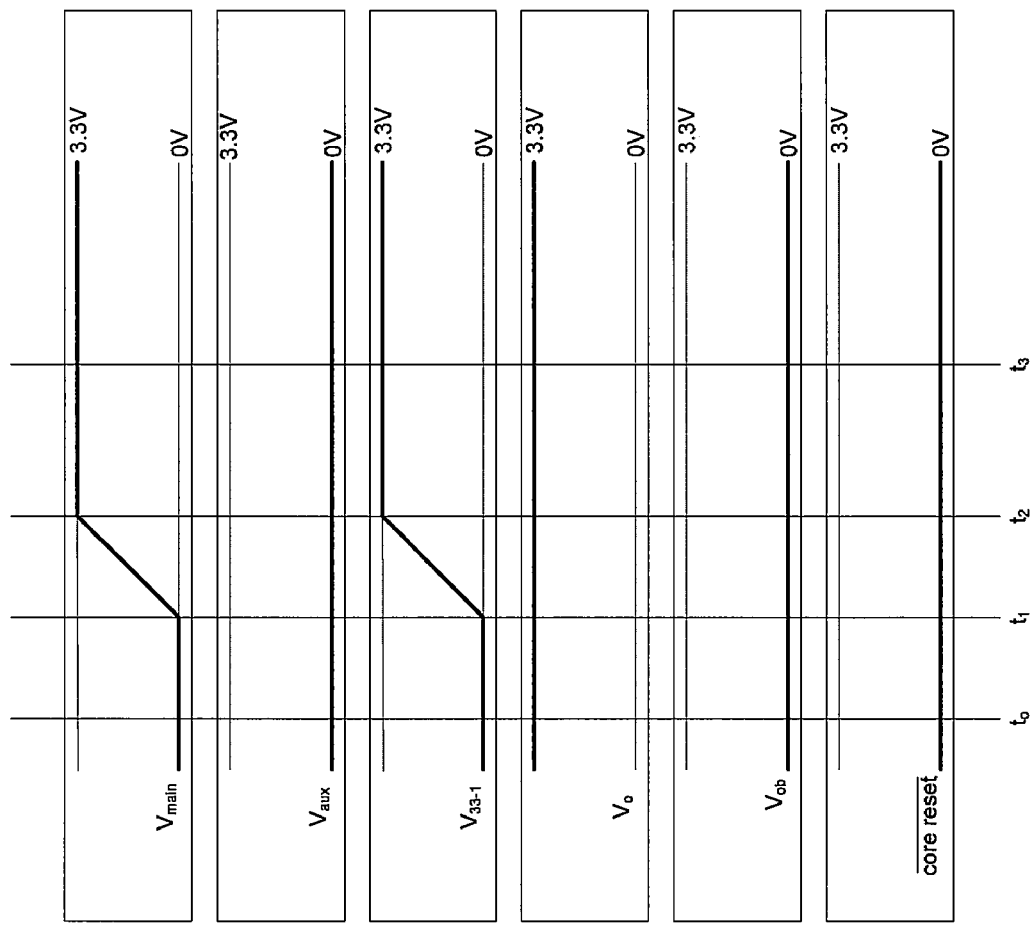
FIG. 5  (All Voltages Are Shown in VDC))

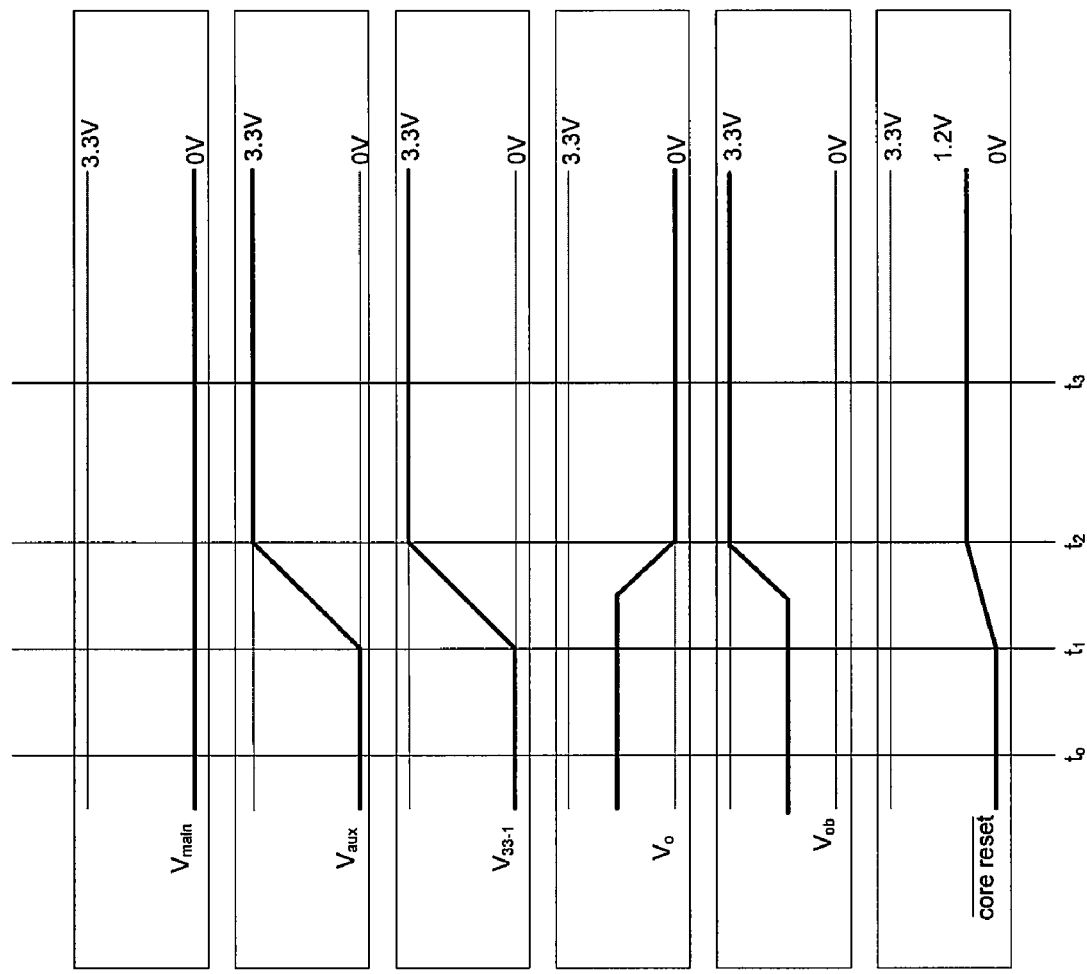
FIG. 6 (All Voltages Are Shown in VDC))

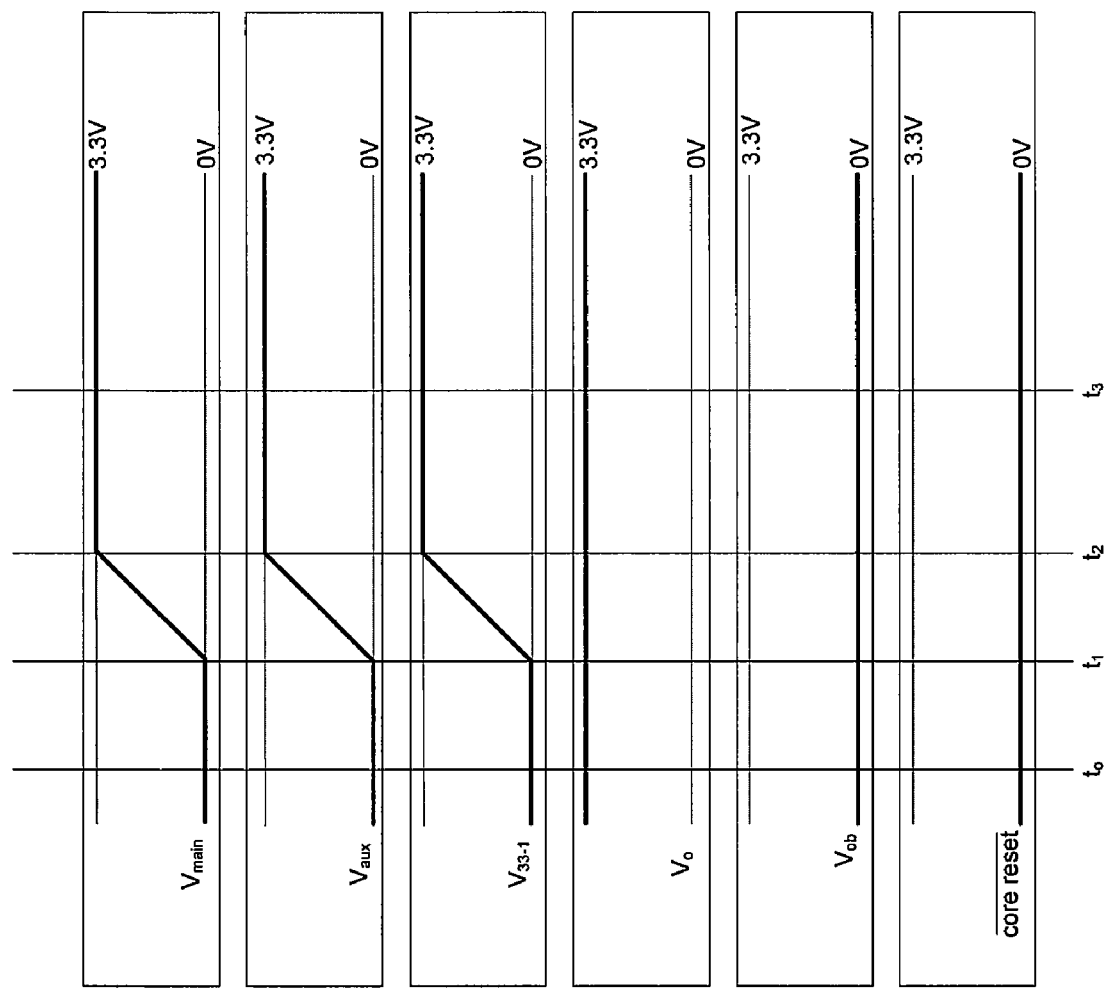
FIG. 7 (All Voltages Are Shown in VDC))

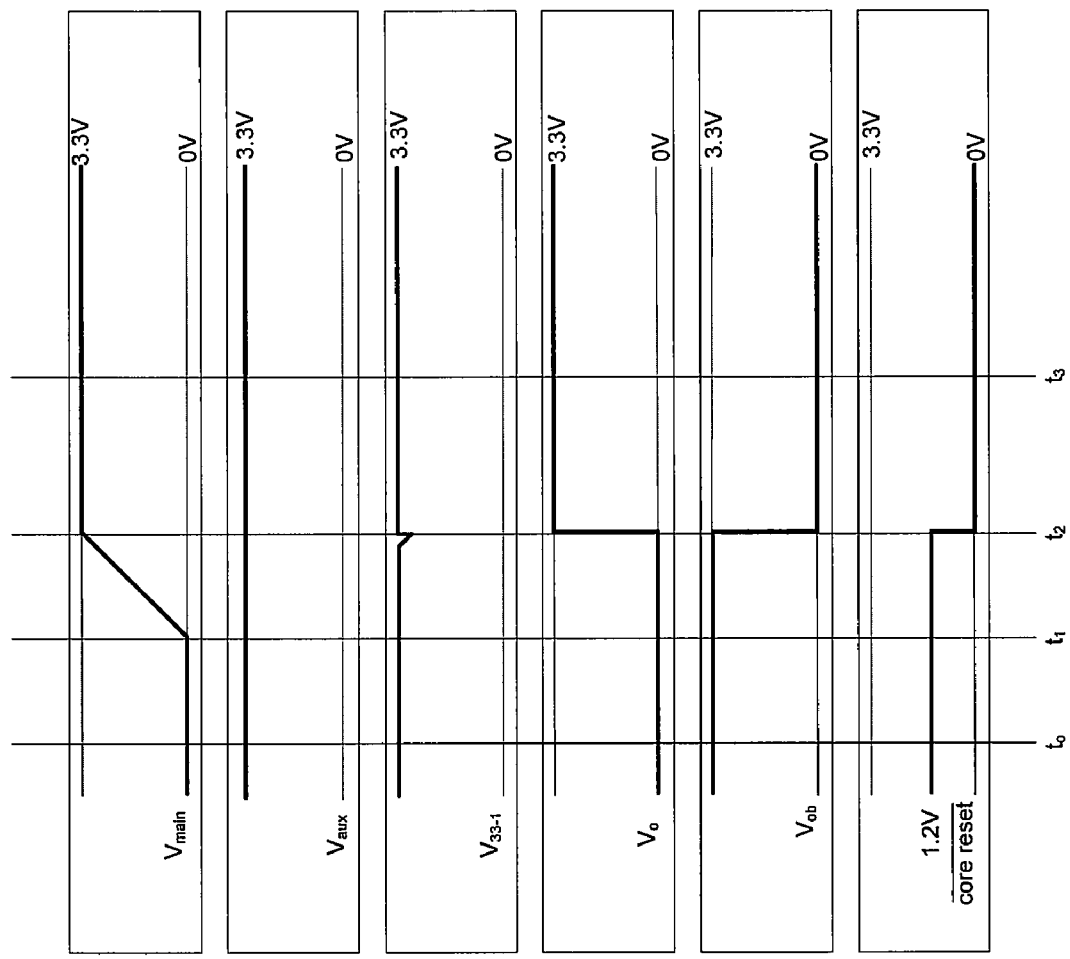
FIG. 8  (All Voltages Are Shown in VDC))

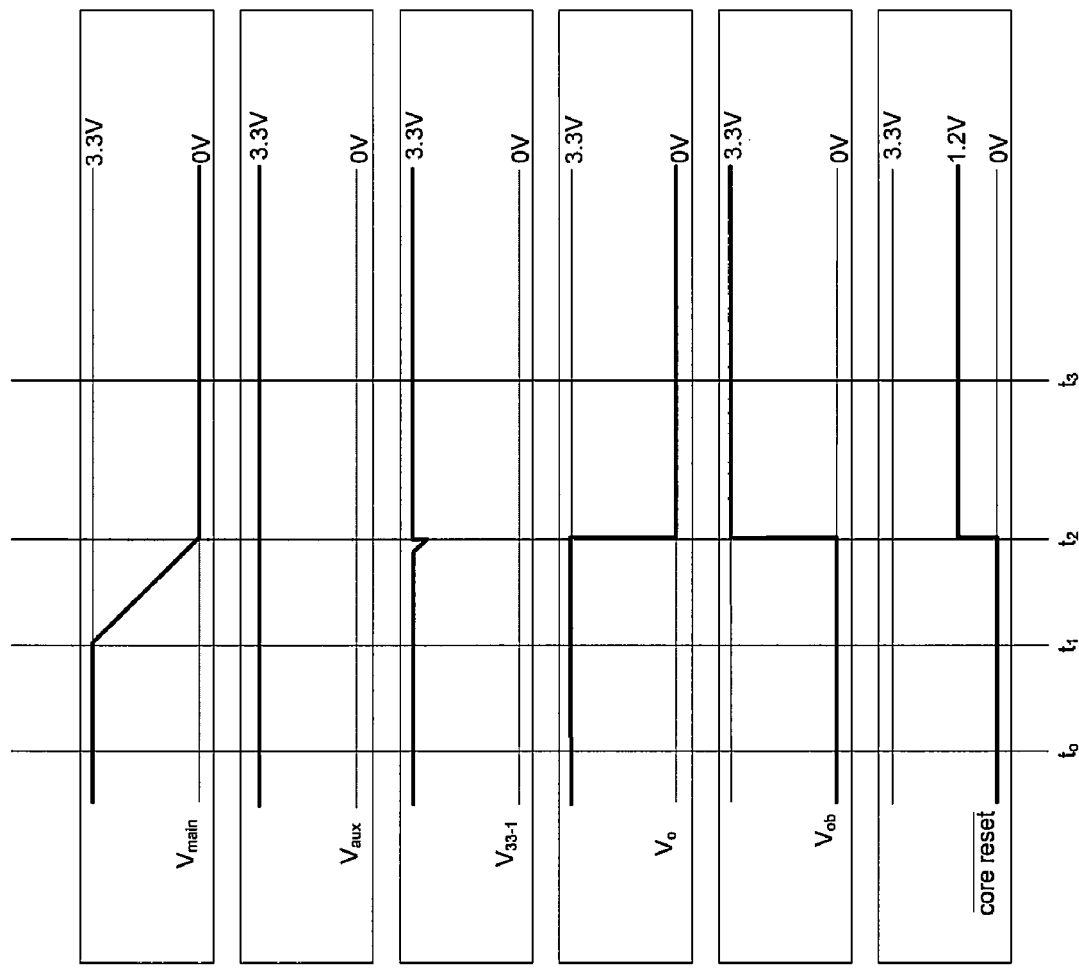
FIG. 9  (All Voltages Are Shown in VDC))

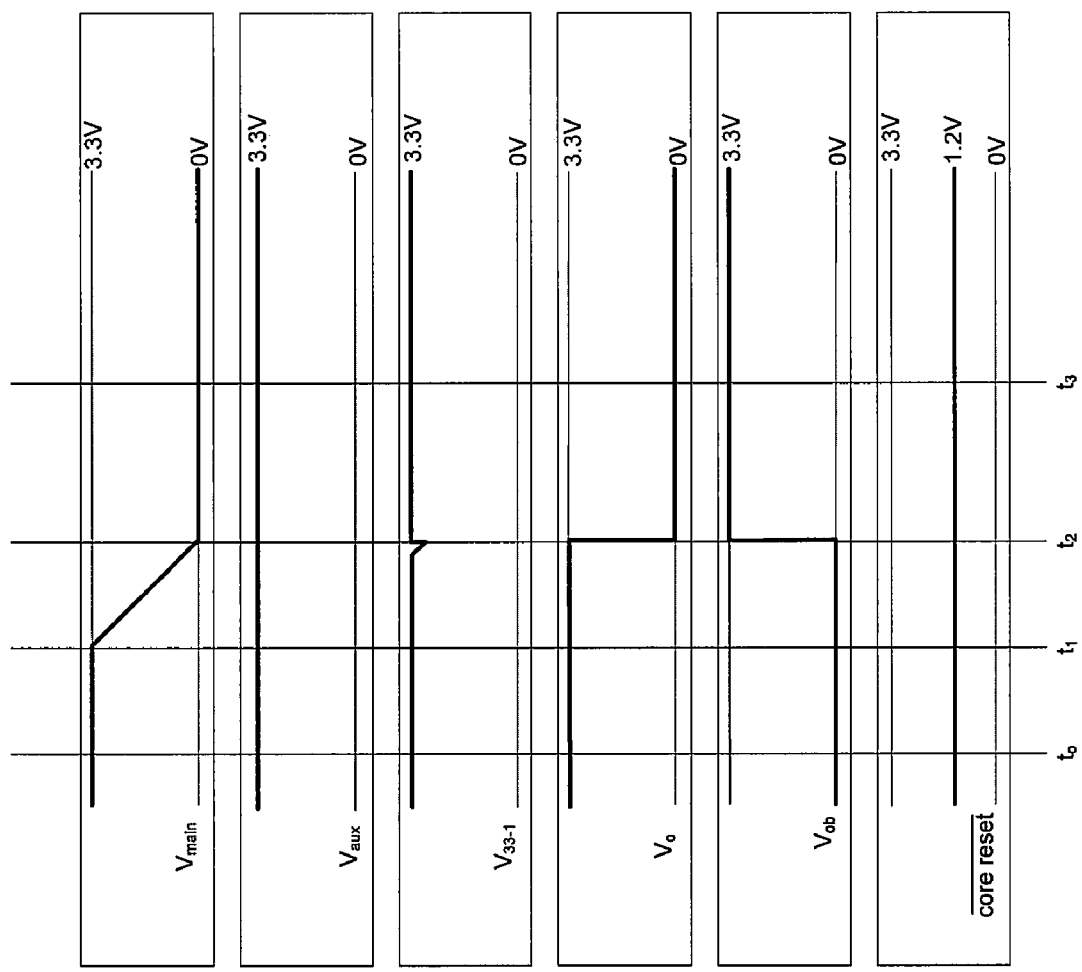
FIG. 10 (All Voltages Are Shown in VDC))

US 7,689,852 B2

METHOD AND SYSTEM FOR PROVIDING POWER MANAGEMENT FOR AN INTEGRATED GIGABIT ETHERNET CONTROLLER

CROSS-REFERENCE TO RELATED APPLICATIONS/INCORPORATION BY REFERENCE

This application makes reference to, claims priority to and claims the benefit of U.S. Provisional Application Ser. No. 60/502,790 filed on Sep. 12, 2003.

This application also makes reference to U.S. application Ser. No. 10/887,061 filed on Jul. 8, 2004.

The above stated application is incorporated herein by reference in its entirety.

FIELD OF THE INVENTION

Certain embodiments of the invention relate to power management for an integrated circuit. More specifically, certain embodiments of the invention relate to a method and system for providing power management in an integrated gigabit Ethernet controller.

BACKGROUND OF THE INVENTION

As the demand for higher data rates and bandwidth requirements continues to increase, various technologies facilitating transmission rates of the order of about 10 Gigabits and higher are being developed for high-speed network applications. High-speed digital communication networks over copper and optical fiber are typically used in many network communication and digital storage applications. Ethernet and Fiber Channel, for example, are two widely used communication protocols which continue to evolve in response to an ever increasing need for higher bandwidth in digital communication systems. Accordingly, there is a need to develop various Gigabit networking devices that may facilitate, for example, high-speed serial data applications. The IEEE P802.3ae draft 5 specification describes the physical layer requirements for 10 Gigabit Ethernet applications and is incorporated herein by reference in its entirety.

The Open Systems Interconnection (OSI) model (ISO standard) was developed to establish standardization for linking heterogeneous computer and communication systems. It describes the flow of information from a software application of a first computer system to a software application of a second computer system through a network medium. The OSI model has seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Importantly, each OSI layer describes certain tasks which are necessary for facilitating the transfer of information through interfacing layers and ultimately through the network. Notwithstanding, the OSI model does not describe any particular implementation of the various layers.

OSI layers 1 to 4 generally handle network control and data transmission and reception. Layers 5 to 7 may be adapted to handle various application issues. Specific functions of each layer may vary depending on factors such as protocol and interface requirements or specifications that are necessary for implementation of a particular layer. For example, the Ethernet protocol may provide collision detection and carrier sensing in the data link layer. Layer 1, the physical layer, is responsible for handling all electrical, optical, opto-electrical and mechanical requirements for interfacing to the communication media. Notably, the physical layer may facilitate the transfer of electrical signals representing an information bit stream. The physical layer may also provide services such as, encoding, decoding, synchronization, clock data recovery, and transmission and reception of bit streams. In high bandwidth applications having transmission speeds of the order of Gigabits, high-speed electrical, optical and/or electro-optical transceivers may be used to implement this layer.

The proliferation of physical layer devices designed to meet the needs of high speed communication applications will, without a doubt, give rise to new challenges. One challenge pertains to the development of circuits that may be adapted to support the high speed communications devices having optimized power consumption. In this regard, various attempts have been made to provide standardized power management procedures for various network devices and/or applications. To ensure proper operation of these high speed communication devices, power control or power management circuits are required for efficiently transitioning the device between various processing states.

The network driver interface specification (NDIS) defines a standardized network application programming interface (API) that provides standardized power management procedures for network interface cards (NICs). In this regard, the NDIS provides a medium access control (MAC) driver that encapsulates or wraps the complexity and details of a network interface card and provides a common application programming interface for accessing various functions of a network interface card. For example, NDIS provides a standardized API that may be used to access Ethernet-based network interface cards.

NDIS also provides a suite or library of functions, which may be adapted as tools that may be used to access the functionality of a network interface card. The suite or library of functions provided by the NDIS may be utilized by various upper level protocol drivers, thereby reducing the complexity of these upper level drivers. For example, a MAC layer driver or even transmission control protocol/internet protocol (TCP/IP) driver may utilize one or more functions of NDIS suite or library of functions.

FIG. 1 is a high-level block diagram of an exemplary NDIS architecture 100. Referring to FIG. 1, there is shown a hardware block 102, a protocol stack 104, a driver block 106, and an application block 108. The hardware block 102 may include the necessary hardware that may be utilized for communicating over a transport medium. Accordingly, the hardware block 102 may include, for example, various integrated circuits and suitable logic that may be adapted to transmit and/or receive signals from a transport medium.

The protocol stack block 104 may be adapted to provide a layered architecture that defines particular functionality and services offered by each layer in the architecture. Specifically, the protocol stack block 104 may be consistent with the layered architecture of the OSI.

The driver block 106 may include a hardware specific driver block 110 and/or a miniport driver block 112. In general, the hardware specific driver block 110 may be adapted to provide platform or hardware specific functionality. In this regard, the use of the hardware specific driver block 110 by non-native applications may be limited and in some instances, some non-native applications may not have the capability to interface with the hardware specific driver block 110. The latter may be particularly true in instances where the hardware specific driver block 110 is proprietary. In general, the miniport driver block 112 may be adapted to provide platform independent functionality such as wrapper functions. In this regard, the miniport driver block 112 may conform to certain standards and may be adapted to provide universal functions, which may be utilized by both native and non-native applications.

The application block 108 may include one or more software applications and/or functions that may be adapted to handle the communication of data received and/or transmitted by the hardware block 102. Applications in the application block 108 may be adapted to utilize the standardized wrapper functions provided by the miniport driver block 112 and/or the proprietary drivers provided by the hardware specific driver block 110. Applications in the application block 108 may utilize various functions provided by either of the hardware specific driver block 110 or the miniport driver block 112 to handle connections, process messages received by the hardware block 102 and messages to be transmitted by the hardware block 102.

For power management purposes, a network controller, such as an Ethernet medium access control (MAC) device, may be required to generate a power management event upon the receipt of certain network events. Those events may include, but are not limited to, network status changes, a management request, receipt of a network wakeup frame and receipt of a magic packet. In general, a wakeup frame may be any specified frame, also called an interested frame, that may be used to wakeup a system.

Particularly, a network wakeup event may be a hardware or software generated request, which may be used to initiate a change in power state of a system or system component or entity. For example, a network wakeup event may be utilized for changing the state of a system and/or device from a lowered powered state to a fully powered state, or vice versa. In general, network wakeup events may be generated external to a network. Exemplary network wakeup frames may include address resolution protocol (ARP) broadcast frames, directed uni-cast frames and NetBIOS broadcast frames.

In some networking applications, depending on the network vendor, some software and/or hardware applications may require the use of a network device capable of recognizing wakeup frames based on pattern matches that may occur anywhere in the first 128 bytes of the frame. Such an implementation may add excessive cost to the hardware required for the network interface controller and/or card (NIC), since additional memory and/or buffers may be required. Furthermore, since additional software programming is required to control the functionality of the network interface card, the programming overhead may further increase the cost associated with the network interface card. Moreover, in Gigabit Ethernet (GbE) wire-speed applications, these associated costs can obviously be prohibitively high. Due to the rapid growth in networking technology, a flexible power management solution is required that will not only meet current power management requirements, but will also be expandable so that it will be applicable to more advanced future networking applications.

Some conventional systems utilize rather large power monitoring circuits to aid in managing the power among the various operating states of the high speed communication devices. However, these large circuits are often complicated and not readily adaptable to the continuously varying power conditions experienced by these devices. The design of some of these power monitoring and management circuitry are often inflexible and may not be readily scaled or adapted to operate in other processing environments or on other platforms. For example, in certain instances, improper switching may result in current flowing back into a main voltage source, thereby increasing an input voltage to an undesired level. This may cause current levels to exceed various specification threshold levels. Depending on the system, this may cause the system to hang or be reset.

Furthermore, these conventional power control circuits may vastly increase the cost of processing because of the space which these power control circuits may occupy on printed circuit boards (PCBs). Since printed circuit board real estate is expensive and scarce, designers find it desirable to maximize the use of printed circuit boards by devoting as much of the real estate as possible to processing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for controlling power for a network interface controller device. Aspects of the method may comprise instantaneously detecting ramp up of a main voltage corresponding to a main voltage source in order to control the network interface controller device. Upon detecting when a threshold voltage for the main voltage is reached during the ramp up of the main voltage, an output from an auxiliary voltage source may be switched to the main voltage source without causing a switch controlling the auxiliary voltage source and a switch controlling the main voltage source to be simultaneously on. A determination may be made as to whether the main voltage is ramping up in excess of a determined rate. If the main voltage is ramping up in excess of the determined rate, a rate at which the main voltage ramps up may be decreased. An inrush current caused by the ramp up of the main voltage may be monitored and the inrush current may be limited to less than about 375 mA. At least a core processor for the network interface controller device may be reset if the inrush current is greater than 375 mA.

Another aspect of the invention may comprise delaying switching from the auxiliary voltage source to the main voltage source and disabling turning on of at least one of the switch controlling the auxiliary voltage source and the switch controlling the main voltage source prior to reaching the threshold voltage. A reset signal that resets at least a core processor of the network interface controller device during detection of the ramp up of the auxiliary voltage may be generated. The reset signal may be generated whenever power down of the main power source is detected. The threshold voltage may be of the order of about 2.7V. A reference voltage threshold may be adjusted in increments of about 100 mV in order to detect changes in the main voltage source in order to provide greater precision or resolution. Another aspect of the invention may further comprise detecting ramp down of the main voltage. In this regard, the output may accordingly be switched from the main voltage source to the auxiliary voltage source without causing a switch controlling the auxiliary voltage source and a switch controlling the main voltage source to be simultaneously on.

Another embodiment of the invention may provide a machine-readable storage, having stored thereon, a computer program having at least one code section for controlling power for a network interface controller device. The at least one code section may be executable by a machine, thereby causing the machine to perform the steps as described above for controlling power for a network interface controller device.

Aspects of the system for controlling power for a network interface controller device may comprise a precision voltage comparator that may instantaneously detect ramp up of a main voltage corresponding to a main voltage source in order to control the network interface controller device. A power monitor may detect when a threshold voltage of the main voltage is reached during ramp up of the main voltage. A main voltage source switch and an auxiliary voltage source switch may switch an output from an auxiliary voltage to the main voltage source without the auxiliary voltage source switch and the main voltage source switch being simultaneously on. The power monitor may determine whether the main voltage is ramping up in excess of a determined rate and if so, the power monitor may decrease a rate at which the main voltage ramps up. The system may further comprise a current limiter and the current limiter and/or the power monitor may monitor an inrush current caused by the ramp up of the main voltage. The current limiter may accordingly limit the inrush current to less than about 375 mA.

The system may further comprise at least one OR gate, and the OR gate and/or the precision voltage comparator may cause generation of a reset signal that resets at least a core processor for the network interface controller device if the inrush current is greater than 375 mA. The power monitor may be adapted to delay switching from the auxiliary voltage source to the main voltage source. The power monitor may also disable turn on of the switch controlling the auxiliary voltage source and/or the switch controlling the main voltage source prior to reaching the threshold voltage. An OR gate and/or the precision voltage comparator may generate a reset signal and the reset signal that may be utilized to reset at least a core processor of the network interface controller device during detection of the ramp up of the auxiliary voltage. The OR gate and/or the precision voltage comparator may generate the reset signal whenever power down of the main power source is detected. The threshold voltage may be of the order of about 2.7V. The precision voltage comparator may adjust a reference voltage threshold in increments of about 100 mV in order to detect changes in the main voltage source. In another aspect of the system, the power monitor may be utilized to detect ramp down of the main voltage. Accordingly, the auxiliary power source switch and the main power source switch may switch the output from the main voltage source to the auxiliary voltage source without causing the auxiliary power source switch and the main voltage source switch to be simultaneously on. The auxiliary power source switch may comprise a first FET coupled to a second FET and the main power source switch may comprise a third FET.

In another embodiment of the invention, a system for controlling power for a network interface controller device may comprise a power monitor coupled to an auxiliary power source switch and a current limiter coupled to the auxiliary power source. A precision voltage comparator may be coupled to the auxiliary power source switch and a main power source switch may be coupled to an OR gate which may be coupled to the precision voltage comparator. The auxiliary power source switch may comprise a first FET coupled to a second FET and the main power source switch may comprise a third FET. The OR gate may be coupled to a power control register and the auxiliary power source switch may be coupled to a reset logic generator.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a block diagram of an exemplary power control system that incorporates a power control circuit in accordance with an embodiment of the invention.

FIG. 3A is a high level block diagram of the power controller block of FIG. 2 and its supporting circuitry, in accordance with an embodiment of the invention.

FIG. 3B is a diagram illustrating the first switch as illustrated in FIG. 3A in accordance with an embodiment of the invention.

FIG. 3C is a diagram illustrating the second switch as illustrated in FIG. 3A in accordance with an embodiment of the invention.

FIG. 4A is a more detailed block diagram of the power controller block of FIG. 2 and it supporting circuitry, in accordance with an embodiment of the invention.

FIG. 4B is a block diagram illustrating a power control system comprising integrated auxiliary power switch in accordance with an embodiment of the invention.

FIG. 4C is a detailed block diagram of the power controller block of FIG. 2 and it supporting circuitry, which is utilized in connection with FIGS. 5-10 for illustrating the voltages at various reference points while in operation, in accordance with an embodiment of the invention.

FIG. 5 is a block diagram illustrating the voltage levels at the reference points within the power control system of FIG. 4C for a system that does not support an auxiliary voltage ($V_{aux}$) in instances when a main power source is powered up, in accordance with an embodiment of the invention.

FIG. 6 is a block diagram illustrating the voltage levels at the reference points within the power control system of FIG. 4C for a system that does support an auxiliary voltage ($V_{aux}$) in instances where a power cord for a host system is plugged into an electrical outlet and $V_{aux}$ ramps up, in accordance with an embodiment of the invention.

FIG. 7 is a block diagram illustrating the voltage levels at the reference points within the power control system of FIG. 4C for a system in instances when the auxiliary voltage ($V_{aux}$) and the main voltage source ($V_{main}$) are powered up, in accordance with an embodiment of the invention.

FIG. 8 is a block diagram illustrating the voltage levels at the reference points within the power control system of FIG. 4C for a system in instances when a host system wakes up from a WOL condition, in accordance with an embodiment of the invention.

FIG. 9 is a block diagram illustrating the voltage levels at the reference points within the power control system of FIG. 4C for a system in instances when a host system goes into a D3 cold state in a non-ACPI environment, in accordance with an embodiment of the invention.

FIG. 10 is a block diagram illustrating the voltage levels at the reference points within the power control system of FIG. 4C for a system in instances when a host system goes into a D3 cold state in an ACPI environment, in accordance with an embodiment of the invention.

DETAILED DESCRIPTION OF THE INVENTION

Figure 1:
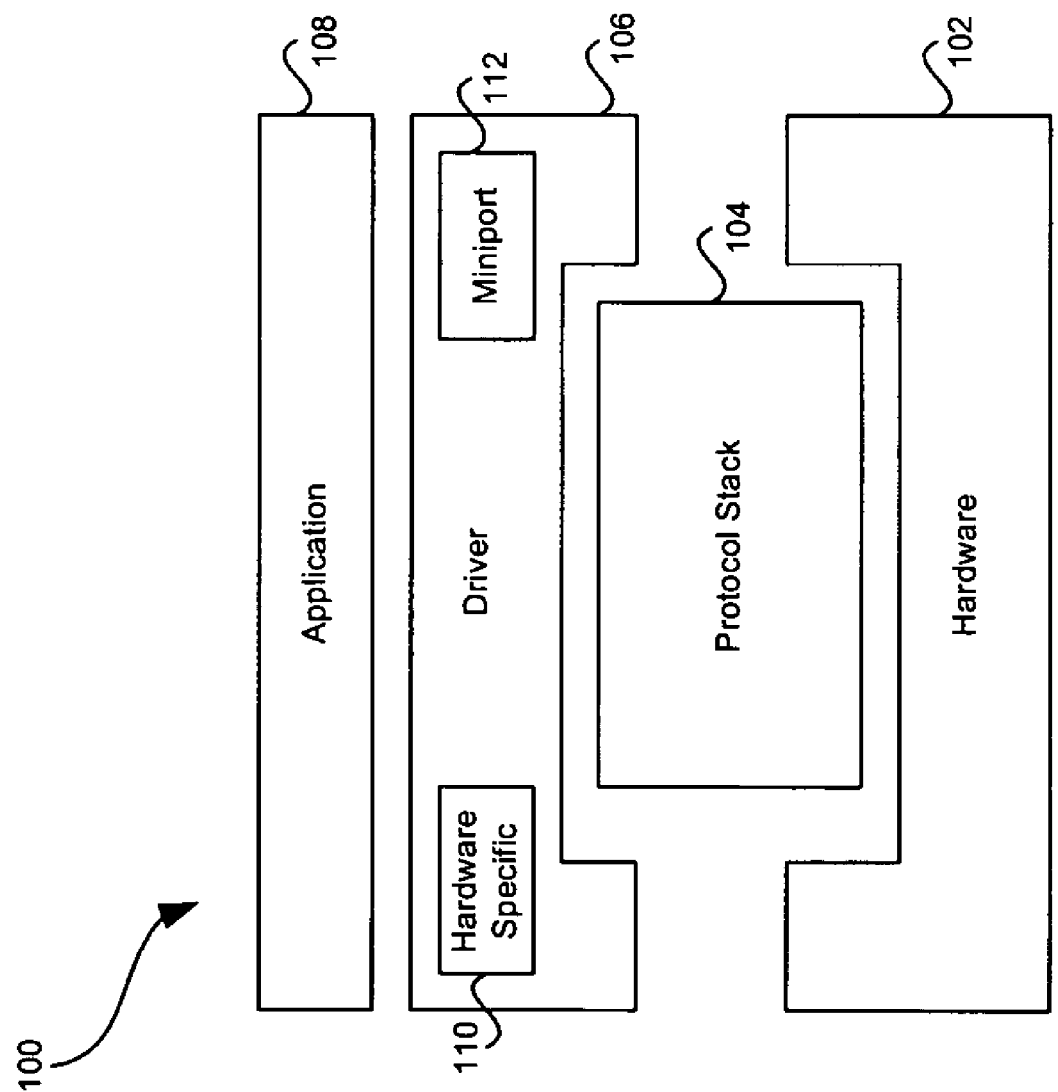
FIG. 1 is a high-level block diagram of an exemplary NDIS architecture.

Aspects of the present invention are found in a method and system for controlling power for a network interface controller device such as a gigabit Ethernet controller. Certain aspects of the invention for controlling power for a network interface controller device may comprise a precision voltage comparator that may instantaneously detect ramp up of a main voltage corresponding to a main voltage source in order to control the network interface controller device. A power monitor may detect when a threshold voltage of the main voltage is reached during the ramp up. A main voltage source switch and an auxiliary voltage source switch may switch an output from an auxiliary voltage to the main voltage source without the main voltage source switch and the auxiliary voltage source switch being simultaneously on. The power monitor may determine whether the main voltage is ramping up in excess of a determined rate and if so, may decrease a rate at which the main voltage ramps up. A current limiter and/or the power monitor may monitor and limit an inrush current caused during ramp up of the main voltage.

In a general computer environment, there are generally two major types of power sources or supplies that are supplied to the internal circuits. The first type of major power may be supplied by an auxiliary voltage source which supplies a voltage that may be referred to as an auxiliary voltage $V_{aux}$. The auxiliary voltage $V_{aux}$ is the voltage that is applied when, for example, a personal computer is plugged into a wall outlet or power receptacle but the power on/off switch on the personal computer is turned to the off position. The second type of voltage may be supplied by a main voltage source which supplies a voltage that may be referred to as a main voltage, $V_{main}$. The main voltage $V_{main}$ may be the voltage generated when, for example, a power on/off switch on the personal computer is turned in the on position. The main voltage ($V_{main}$) may also be referred to as $V_{33-1}$, which represents a 3.3V input voltage. Accordingly, a power control system is disclosed that controls switching between various combinations of on/off conditions for the main voltage ($V_{main}$) and on/off conditions for the auxiliary voltage ($V_{aux}$). Personal computer as utilized herein, unless otherwise stated, may comprise any computer system comprising laptops, notebooks, handhelds, desktops, and servers. Although various other types of voltage levels may be utilized, these required voltage levels may be generated from the main voltage source $V_{main}$ and the auxiliary voltage source $V_{aux}$.

In instances where a personal computer comprises a local area network (LAN) card, which is more generically referred to as a network interface card (NIC), the NIC may be adapted to operate utilizing voltage supplied from either the auxiliary voltage source ($V_{aux}$) or the main voltage source ($V_{main}$). A controller chip such as a gigabit Ethernet (GbE) controller chip integrated with the NIC may be adapted to operate from the moment when a power cord for the host system is plugged into a wall socket or outlet. The main voltage source ($V_{main}$) and the auxiliary voltage source ($V_{aux}$) may therefore, supply a voltage to a bus, for example, a PCI, PCI-X or PCI Express bus into which the network interface card is plugged.

In this regard, power management operations may be adapted to place the gigabit Ethernet (GbE) controller in an operating mode where it may wait to receive context information from an Ethernet link. This context information may be utilized to, for example, wake up the system when a wakeup event or wakeup packet is received from the Ethernet link. The power to the gigabit Ethernet (GbE) controller may then be switched from the auxiliary power source (Vaux) to the main power source ($V_{main}$) once the host system wakes up.

FIG. 2 is a block diagram 200 of an exemplary power control system that incorporates a power control circuit in accordance with an embodiment of the invention. Referring to FIG. 2, there is shown a controller 202, a bus power block 204, a power controller block 206, a first switch 208 and a second switch 210. An auxiliary power source ($V_{aux}$) may be coupled to the first switch 208 and a second primary or main power source ($V_{33-2}$) may be coupled to the second switch 210. The output voltage ($V_{out}$) produced by the power control system is denoted $V_{33-1}$. In one aspect of the invention, the second primary or main power source ($V_{33-2}$) may be a 3.3 volt source. However, the general principles in accordance with the various embodiments of the invention are not so limited. Although the first switch 208 and the second switch 210 are illustrated separate form the power controller block 206, the invention is not so limited. Accordingly, at least one of the first switch 208 and the second switch 210 may be integrated with the power controller block 206.

The controller 202 may be a microprocessor, microcontroller or other device such a gigabit Ethernet (GbE) controller and may comprise any necessary supporting circuitry and/or logic that may be utilized to implement a particular function. In this regard, the controller 202 may be implemented as, for example, an integrated circuit (IC), an application specific integrated circuit (ASIC) or a system on a chip (SoC).

The power controller block 206 may comprise electronic circuitry that may be adapted to provide the necessary logic for controlling switching between the auxiliary power source ($V_{aux}$) and the main power source ($V_{main}$). An exemplary power controller block is illustrated in FIG. 3A and subsequently described with reference thereto. An output voltage generated by the power control block 206 may be supplied as an input voltage to the controller 202.

The bus power block 204 may be interfaced to the controller 202 and may be adapted to provide and control power for a bus interface. In accordance with an embodiment of the invention, the bus interface may be, for example, a PCI, PCI-X or a PCI Express bus. Notwithstanding, the bus power block 204 may comprise suitable circuitry and/or logic that may be adapted to generate, for example, 1.2V, 2.5V or other voltages that may be required for power control. In this regard, the bus power block may be adapted to convert an input voltage such as $V_{main}$ to required voltages such as 1.2V and 2.5V.

The first switch 208 and the second switch 210 may be field effect transistors (FETs) or variants thereof, for example, metal oxide semiconductor FETS (MOSFETS) or JFETS. In this regard, the first switch 208 and the second switch 210 are coupled so that they provide an exclusive OR (XOR) function. Additionally, the first switch 208 and the second switch 210 are coupled so that they switch between the auxiliary power source ($V_{aux}$) and the main power source ($V_{main}$).

In operation, the power control block 206 may control switching of the auxiliary power source ($V_{aux}$) and the primary power source ($V_{33-2}$) by turning on or off any of the first switch 208 and the second switch 210. In this regard, the output voltage $V_{33-1}$ supplied to the controller 209 may be utilized to facilitate transition between the various operating states or modes of the controller 205. U.S. application Ser. No. 10/887,061 discloses various power management operating states and is hereby incorporated by reference herein in its entirety.

FIG. 3A is a high level block diagram 300 of the power controller block 206 of FIG. 2 and its supporting circuitry, in accordance with an embodiment of the invention. Referring to FIG. 3A, there is shown a first switch 302, a second switch 304 and a wake-on-LAN (WOL) control module 306. The WOL module 306 may comprise a current limiter 308, a power monitor 310, a logic block 312 and a voltage comparator 314.

FIG. 3B is a diagram illustrating the first switch 302 as illustrated in FIG. 3A in accordance with an embodiment of the invention. Referring to FIG. 3B, the first switch 304 may comprise a single FET 322. The single FET 322 may also be referred to as a $V_{main}$ FET and may be coupled to, for example, the main voltage source ($V_{main}$) and the logic block 312. An output of the $V_{main}$ FET 322 may also function as the output $V_{33-1}$, the latter of which may be coupled to the controller 202. In this regard, output $V_{33-1}$ provides the required operating voltage to the controller 202 to support the controller's various operating modes.

FIG. 3C is a diagram illustrating the second switch 304 as illustrated in FIG. 3A in accordance with an embodiment of the invention. Referring to FIG. 3C, the second switch 304 may comprise a first FET 332 and a second FET 334. The first FET 332 may be tied to a lead of the second FET 334 as illustrated. The first FET 332 may also be coupled to the auxiliary voltage source ($V_{aux}$) and the current limiter 308. The second FET 334 may be coupled to the to power monitor 310. An output of the second FET 334 may be adapted to supply an appropriate voltage to the output $V_{33-1}$. The first FET 322 and the second FET 334 may be adapted referred to as auxiliary voltage FETs since the may be adapted to control switching of the auxiliary voltage source ($V_{aux}$) to the output $V_{33-1}$.

Referring to FIG. 3A, the current limiter 308 may be an inrush current limiter. Notwithstanding, the current limiter 308 may comprise suitable logic and/or circuitry that may be adapted to limit the current flow during ramping up of the voltage source on power up. In this regard, the current limiter 308 may be adapted to limit the inrush current to 375 mA as provided by the PCI specification. In general, if the 375 mA current limit is exceeded, an error condition would result. However, in accordance with an aspect of the invention, the inrush current limiter 308 may be adapted to limit the inrush current in order to ensure that the 375 mA limit is not exceeded. This will ensure that no errors condition will result on power up or during switching.

For example, when a personal computer is plugged into a wall outlet or power receptacle, the auxiliary power source ($V_{aux}$) may rapidly transition from 0V to 3V. If the auxiliary power source ($V_{aux}$) is connected directly to the output $V_{33-1}$ via the second switch 304 in this manner, then the output $V_{33-1}$ would have the same ramp up rate as the voltage produced by the auxiliary voltage source ($V_{aux}$). However, in this case, if $V_{33-1}$ is allowed to have the same ramp up rate as the auxiliary voltage ($V_{aux}$) then the current surge would rapidly charge up the capacitive elements in the circuit of FIG. 3A and the current would exceed the maximum limit of 375 mA. Accordingly, the current limiter 308 is adapted to control a rate at which the auxiliary voltage source ($V_{aux}$) ramps up and limit the inrush current so that it does not exceed the specified 375 mA. In other words, when the power cord is plugged in, the current limiter 308 keeps the rate at which the capacitors are charged low enough to ensure that the inrush current is limited to 375 mA.

The power monitor 310 may also be referred to as a "powergood" monitor. Notwithstanding, the power monitor 310 may comprise various line conditioning circuits that may be adapted to detect any glitches that may occur during switching and smooth out any associated spikes that may occur. For example, when the main power source ($V_{main}$) ramps up and the voltage source switches from the auxiliary voltage source ($V_{aux}$) to the main voltage source ($V_{main}$), the power monitor 310 may be adapted to facilitate a smooth transformation between the voltage sources $V_{aux}$ and $V_{main}$ by eliminating any glitches that may occur.

The logic block 312 may comprise suitable circuitry and/or logic that may be adapted to switch between the auxiliary voltage source ($V_{aux}$) and the main voltage source ($V_{main}$) depending on, for example, an output signal generated by the voltage comparator 314. In this regard, the logic block 312 may comprise, for example, various tri-state buffers that may be adapted to temporarily operate the switches 302, 304 in a tri-state mode until the voltage ramps up to a suitable level threshold voltage. The logic block 312 may also be adapted to control reset logic/generator, current limiter 308 and power monitor 310.

The voltage comparator 314 may be a precision voltage comparator. The main voltage source $V_{main}$ and auxiliary voltage source $V_{aux}$ may be coupled as inputs to the voltage comparator 314. Notwithstanding, the voltage comparator 314 may comprise a bandgap circuit the may be adapted to generate a reference voltage ($V_{ref}$). The voltage comparator 314 may compare the reference voltage ($V_{ref}$) to an input voltage such as $V_{main}$, and accordingly, generate an output signal that may be utilized to control, for example, the logic block 312, the power monitor 310, and the reset logic/generator. The precision voltage comparator 314 may be adapted to adjust the reference voltage ($V_{ref}$) in small increments, for example, about 100 mV in order to provide precise switching by the switches 302, 304. Notwithstanding, the resolution of the precision voltage comparator 314 may be configured to provide more precise switching points for turning on/off the switches 302, 304.

In general, if the power switch on the personal computer or a host device is off, the reference voltage ($V_{ref}$) will be greater than the main voltage ($V_{main}$). However, if the power switch is on, then the main voltage ($V_{main}$) will be greater than the reference voltage ($V_{ref}$). Accordingly, the voltage comparator 314 will enable the logic block 312 to turn off switch #2 304, turn on switch #1 302, thereby supplying power from the main voltage source ($V_{main}$) to the output $V_{33-1}$. The controller 202 would therefore be powered by the main voltage source ($V_{main}$). Otherwise, switch #2 304 would be on, switch #1 would be off, and the output voltage ($V_{33-1}$) would be supplied by the auxiliary voltage source ($V_{aux}$).

FIG. 4A is a more detailed block diagram 400 of the power controller block of FIG. 2 and it supporting circuitry, in accordance with an embodiment of the invention. Referring to FIG. 4A, there is shown a first switch 404, a second switch 408 and a wake-on-LAN (WOL) control module 402. The wake-on-LAN (WOL) control module 402 may comprise a current limiter 418, a power monitor 416, a precision voltage comparator 418, OR gate 426 and a plurality of tri-state buffers and resistors. These components are similar to the corresponding components of FIG. 3A, 3B and 3C. However, FIG. 4A illustrates the coupling of the various components of the power controller block 206 of FIG. 2.

FIG. 4A illustrates the connection of the FET 406 in the first switch 404 to the XOR gate 426, the input main voltage source ($V_{main}$) and the output $V_{33-1}$. FIG. 4A also illustrates the interconnection of the two FETS 410, 412 comprising the second switch 408. The FETS 410, 412 are coupled to the current limiter 418, the power monitor 416 and the input auxiliary voltage source ($V_{aux}$).

Notwithstanding, the power control controller block of FIG. 2 and its supporting circuitry as illustrated in FIG. 4A, may further comprises a power control register 424 and a reset logic/generator block 420. The power control register 424 may be coupled to the WOL power control module 402 and in particular the XOR gate 426. In this regard, software and/or firmware may be utilized to control current flow via the power control register and/or the OR gate. In an aspect of the invention, a power control driver may be adapted to control the operation of the power control system of FIG. 4A.

The reset logic/generator block 420 may comprise suitable circuitry and/or logic that may be adapted to generate an output reset signal based on, for example, an input signal received from the precision voltage comparator 414 and/or the power control register 424. The output reset signal generated by the reset logic/generator block 420 may be utilized to reset a core processor of a network interface card, for example. This output signal generated by the reset logic/generator block 420 may be referred to as a core reset signal and may be utilized to reset, for example, a core CPU that controls a gigabit Ethernet controller.

The reset logic/generator block 420 may be utilized to issue an output reset signal in instances where the inrush current exceeds the 375 mA threshold. For example, the reset signal generated by the reset logic/generator block 420 may be utilized to reset the gigabit Ethernet controller whenever it draws more than 375 mA in the D3 cold state. In another example, the reset logic/generator block 420 may be adapted to reset the controller in instances when the inrush current may exceed the 375 mA threshold. The reset logic/generator block 420 may also be adapted to generate a reset whenever the WOL power control module detects the main power source ($V_{main}$). This may be particularly useful in instances where a host system lacks an advanced configuration and power interface (ACPI). Accordingly, in instances when the current exceeds the 375 mA in the auxiliary FETs 410, 412, the reset logic/generator 420 is adapted to reset the core processor of a network interface card.

In general, an advanced configuration and power interface (ACPI) is utilized to generate events and control transition between various power management states. However, in a non-ACPI environment or host system where there is no power management or control application running, the reset logic/generator block 420 may be utilized to reset a core processor of the network interface card. A DOS based personal computer may be a non-ACPI environment. In instances where a host system such as a personal computer having no ACPI application support is powered down, then the WOL power control module or chip 402 may detect the loss of power and the reset logic/generator block 420 may issue a reset signal to the core processor controlling a gigabit Ethernet controller chip. Upon issuance of the reset signal by the reset logic/generator block 420, the gigabit Ethernet chip may enter a D3 cold state in order to consume less power.

U.S. application Ser. No. 10/887,061 discloses a ACPI interface that may be utilized in connection with the invention and is hereby incorporated by reference herein in its entirety.

Although the switches 404 and 408 are integrated externally to the WOL power control module or chip 402, the invention is not so limited. Accordingly, FIG. 4B illustrates an embodiment of the invention in which the auxiliary power switch is integrated within the chip 402. FIG. 4B is a block diagram 440 illustrating a power control system comprising an integrated auxiliary power switch in accordance with an embodiment of the invention. Referring to FIG. 4B, there is shown an integrated circuit 442 comprising auxiliary power source switch 446, a WOL power control module 444, an "other" or miscellaneous block 448, main power source switch 450 and bipolar junctions (BJTs) 452, 454.

The auxiliary power source switch 446 may comprise a first FET 456 and a second FET 458. The main power source switch 450 comprises FET 460. The WOL power control module 444 comprises a precision voltage comparator, a current limiter and a power monitor. The other or miscellaneous block 448 may comprise a power control register and a reset logic/generator block. The precision voltage comparator, current limiter, power monitor, power control register and a reset logic/generator block may be coupled as shown in FIG. 4A.

With regard to the auxiliary power source switch 446, the first FET 456 may be coupled to the input auxiliary voltage source ($V_{aux}$), the second FET 458 and the WOL power control module 444. The second FET 458 may be coupled to and controlled by the WOL power control module 444. In combination, the first FET 456 and the second FET 458, under control of the WOL power control module 444, may be adapted to control switching on/off the auxiliary voltage source ($V_{aux}$). The FET 460 of the main power source switch 450 may be adapted to control switching on/off of the main voltage source ($V_{main}$). The BJTs 452 and 454 provide the 2.5V and 1.2V regulated voltage sources. Input signal $V_{ddio}$ provides an input voltage to the integrated circuit 442.

FIG. 4C is a detailed block diagram 460 of the power controller block of FIG. 2 and its supporting circuitry, which is utilized in connection with FIGS. 5-10 for illustrating the voltages at various reference points while in operation, in accordance with an embodiment of the invention. Referring to FIG. 4C, the components or FIG. 4C are identical to FIG. 4A. Notwithstanding, FIG. 4C comprises various voltage reference points, each of which are utilized to indicate a voltage level during a particular operating mode. These operating modes are illustrated in FIG. 5 through FIG. 10. The voltage reference points illustrated in FIG. 4C may comprise $V_{main}$, $V_{aux}$, $V_{33-1}$, $V_o$, $V_{ob}$, and a core reset signal.

In general, during power up, the power control system of FIG. 4A is adapted to switch from the auxiliary voltage source ($V_{aux}$) to the main voltage source ($V_{main}$). On power down, the power control circuit of FIG. 4A is adapted to sense or detect when the main power source ($V_{main}$) goes down and switches from the main voltage source ($V_{main}$) to the auxiliary voltage source ($V_{aux}$). Accordingly, whenever the main voltage source ($V_{main}$) is on, the auxiliary voltage source ($V_{aux}$) is disconnected, and whenever the auxiliary voltage source ($V_{aux}$) is on, the main voltage source ($V_{main}$) is disconnected. Hence, the power control system of FIG. 4A is adapted to sense or detect a power up state and a power down state and accordingly switch between the main voltage source ($V_{main}$) and the auxiliary voltage source ($V_{aux}$).

In instances when the WOL power control module 402 is powered off, $V_o$ and $V_{ob}$ may be kept in a tri-state condition. However, when the main power source ($V_{main}$) is turned on, there is no glitching in $V_o$ and $V_{ob}$ since the power monitor 416 and tri-state buffers are adapted to prevent any glitching. The power monitor 416 is adapted to eliminate or minimize any glitching that may occur by disabling $V_o$ and $V_{ob}$ in instances where the auxiliary voltage source ($V_{aux}$) falls below, for example, about 2.7V.

In accordance with an aspect of the invention, the power control system of FIG. 4C utilizes a "make before break" principle in which the circuit employs a precision switching mechanism to turn on/off the FETs in the switches 404, 408. In this regard, a delay of, for example, about 1 µS may also be provided before switching on any of the FETs in order to eliminate simultaneously turning on the FETs in the switches 404, 408.

In operation, in instances when the auxiliary power source ($V_{aux}$) is turned on and begins to ramp at too fast a rate, the inrush current limiter 418 may be adapted to detect the fast ramp up rate and accordingly limit the inrush current. In this regard, the inrush current limiter 418 may be adapted to reduce the rate at which FET 410 in the second switch 408 is turned on. Accordingly, the inrush current may be kept below the 375 mA specification limit.

FIG. 5 is a block diagram illustrating the voltage levels at the reference points within the power control system of FIG. 4C for a system that does not support an auxiliary voltage ($V_{aux}$) in instances when a main power source is powered up, in accordance with an embodiment of the invention. Initially, the main power source ($V_{main}$) and the auxiliary power source ($V_{aux}$) are both down. Accordingly, $V_{aux}$ will remain at 0V for all time instants. At time instant $t_0$, the main voltage ($V_{main}$) is 0V, $V_{aux}$ is 0V, $V_{33-1}$ is 0V, $V_o$ is 3.3V, $V_{ob}$ is 0V and the core reset signal is 0V. At time instant $t_1$, the main voltage ($V_{main}$) is 0V and begins to ramp up at the instant the main voltage source is powered on. At time instant $t_1$, all the other signals including $V_{aux}$, $V_{33-1}$, $V_o$, $V_{ob}$ and the core reset signals remain at the same value as they were at time instant $t_0$. However, as the main voltage ($V_{main}$) begins to ramp up, $V_{33-1}$ also begins to ramp up at time instant $t_1$. Between time instants $t_1$ and $t_2$, $V_{main}$ and the output $V_{33-1}$ continues to ramp up. Between time instants $t_2$ and at time $t_3$, $V_{aux}$ remains at 0V, $V_o$ remains at 3.3V, $V_{ob}$ remains at 0V and the core reset signal remains at 0V. At time instant $t_3$, the voltage source $V_{main}$ is fully powered up, $V_{main}$ is connected to $V_{33-1}$ and the signals $V_{main}$, $V_{aux}$, $V_{33-1}$, $V_o$, $V_{ob}$, and the core reset signal maintain the same values they had at time instant $t_2$. Accordingly, this results in the main voltage source ($V_{main}$) being connected to the output $V_{33-1}$.

FIG. 6 is a block diagram illustrating the voltage levels at the reference points within the power control system of FIG. 4C for a system that does support an auxiliary voltage ($V_{aux}$) in instances where a power cord for a host system is plugged into an electrical outlet and $V_{aux}$ ramps up, in accordance with an embodiment of the invention. The main voltage ($V_{main}$) will remain at 0V for all time instants $t_0$ through $t_3$. Initially, the main power source ($V_{main}$) and the auxiliary power source ($V_{aux}$) are both down. At time instant $t_0$, the voltage supplied by the voltage source ($V_{aux}$) is initially 0V, $V_{33-1}$ is 0V, and the core reset signal is 0V. $V_o$ and $V_{ob}$ are between 0V and 3.3V. At time instant $t_1$, the auxiliary voltage $V_{aux}$ is 0V at the instant the auxiliary voltage source is powered on. All the other signals are the same as they were at time instant to. Also, at time instant $t_1$, the auxiliary voltage ($V_{aux}$) then begins to ramp up and so does $V_{33-1}$. Between time instants $t_1$ and $t_2$, $V_o$ begins ramping down and $V_{ob}$ begins ramping up. At time instant $t_2$, $V_{aux}$, $V_{33-1}$ and $V_{ob}$ are 3.3V, and $V_o$ is 0V. At time instant $t_3$, $V_{aux}$, $V_{33-1}$ and $V_{ob}$ remain at 3.3V, and $V_o$ remains 0V. At time $t_1$, the core reset signal begins ramping up at about the same time $V_{aux}$ begins to ramp up and at time instant $t_2$, the core reset signal is 1.2V and the value is maintained at time instant $t_3$. Accordingly, the auxiliary voltage source ($V_{aux}$) is now connected to the output $V_{33-1}$.

FIG. 7 is a block diagram illustrating the voltage levels at the reference points within the power control system of FIG. 4C for a system in instances when the auxiliary voltage ($V_{aux}$) and the main voltage source ($V_{main}$) are powered up, in accordance with an embodiment of the invention. Initially, the main power source $V_{main}$ and the auxiliary power source ($V_{aux}$) are both down. Accordingly, at time instant $t_0$, $V_{main}$, $V_{aux}$, $V_{33-1}$, $V_{ob}$ and the core reset signal are 0V. At time instant $t_1$, $V_o$ is initially 3.3V. At time instant $t_1$, $V_{main}$, $V_{aux}$, and $V_{33-1}$ begins ramping up and at time $t_2$, $V_{main}$, $V_{aux}$, $V_{33-1}$ are 3.3V. Also, at time instant $t_2$, $V_o$, $V_{ob}$ remain at the same values as they were at time instants $t_1$ and $t_2$. At time instant $t_3$, $V_{main}$, $V_{aux}$, $V_{33-1}$, $V_o$ are maintained at 3.3V and $V_{ob}$ and the core reset signal are maintained at 0V. Accordingly, the main voltage source ($V_{main}$) is now connected to the output $V_{33-1}$.

FIG. 8 is a block diagram illustrating the voltage levels at the reference points within the power control system of FIG. 4C for a system in instances when a host system wakes up from a WOL condition, in accordance with an embodiment of the invention. Initially, at time instant $t_0$, $V_{main}$ and $V_o$ are 0V. Also, at time instant $t_0$, $V_{aux}$, $V_{33-1}$ and $V_{ob}$ are 3.3V, and the core reset signal is 1.2V. This means that the main power is off and the system is connected to $V_{33-1}$. At time instant $t_1$, $V_{main}$ is 0V and begins to ramp up. Also, at time instant $t_1$, $V_{aux}$, $V_{33-1}$, $V_o$, $V_{ob}$ and the core reset signal are maintained at the same values as they were at time instant $t_0$. The main voltage ($V_{main}$) continues to ramp up until it reaches time instant $t_2$. At time instant $t_2$, $V_{aux}$ and $V_{33-1}$ are maintained at the same values they were at time instants $t_1$ and $t_0$. However, at time instant $t_2$, $V_o$ transitions from 0V to 3.3V, $V_{ob}$ transitions from 3.3V to 0V and the core reset signal transitions from 1.2V to 0V. At time instant $t_3$, $V_{main}$, $V_{aux}$, $V_{33-1}$ and $V_o$ remain at 3.3V, and $V_{ob}$ and the core reset signal remain at 0V. Accordingly, the main voltage source ($V_{main}$) is connected to the output $V_{33-1}$.

FIG. 9 is a block diagram illustrating the voltage levels at the reference points within the power control system of FIG. 4C for a system in instances when a host system goes into a D3 cold state in a non-ACPI environment, in accordance with an embodiment of the invention. Initially, the auxiliary power source ($V_{aux}$) is up and the main voltage source ($V_{main}$) is coupled to the output $V_{33-1}$. This may occur in instances when a personal computer was originally on and is subsequently being turned off.

In this regard, at time instant $t_0$, $V_{main}$, $V_{aux}$, $V_{33-1}$, and $V_o$ are 3.3V. Also, at time instant $t_0$, $V_{ob}$ and the core reset signal are 0V. At time instant $t_1$, $V_{main}$ is at 3.3V and starts ramping down and $V_{aux}$, $V_{33-1}$, $V_o$ and the core reset signal are maintained at the same values there were at time instant $t_0$. At time instant $t_2$, $V_{main}$ stops ramping and is 0V, and $V_{aux}$ and $V_{33-1}$ are maintained at the same values they were at time instant $t_1$. However, also at time instant $t_2$, $V_o$ transitions from 3.3V to 0V, $V_{ob}$ transitions from 0V to 3.3V and the core reset signal transitions from 0V to 1.2V. At time instant $t_3$, $V_{main}$ is 0V, $V_{aux}$ and $V_{33-1}$ are maintained at 3.3V, $V_o$ is 0V, $V_{ob}$ is 3.3V and the core reset signal is 1.2V. Accordingly, the auxiliary voltage source ($V_{aux}$) is connected to the output $V_{33-1}$ and a reset signal is issued to the core CPU.

FIG. 10 is a block diagram illustrating the voltage levels at the reference points within the power control system of FIG. 4C for a system in instances when a host system goes into a D3 cold state in an ACPI environment, in accordance with an embodiment of the invention. Initially, the auxiliary power source ($V_{aux}$) is up and the main voltage source ($V_{main}$) is coupled to the output $V_{33-1}$. This may occur in instances when a personal computer was originally on and is subsequently being turned off.

In this regard, at time instant $t_0$, $V_{main}$, $V_{aux}$, $V_{33-1}$, and $V_o$ are 3.3V. Also, at time instant $t_0$, $V_{ob}$ is 0V and the core reset signal is 1.2V. At time instant $t_1$, $V_{main}$ is at 3.3V and starts ramping down and $V_{aux}$, $V_{33-1}$, $V_o$ and the core reset signal are maintained at the same values there were at time instant $t_0$. Hence, the core reset signal is maintained at 1.2V. At time instant $t_2$, the main voltage ($V_{main}$) stops ramping down and is 0V, and $V_{aux}$ and $V_{33-1}$ are maintained at the same values they were at time instant $t_1$. However, also at time instant $t_2$, $V_o$ transitions from 3.3V to 0V, $V_{ob}$ transitions from 0V to 3.3V.

However, the core reset signal is still maintained at 1.2V. At time instant $t_3$, $V_{main}$ is 0V, $V_{aux}$ and $V_{33-1}$ are maintained at 3.3V, $V_o$ is maintained 0V, $V_{ob}$ is maintained 3.3V and the core reset signal is maintained 1.2V. Accordingly, the auxiliary voltage source ($V_{aux}$) is connected to the output $V_{33-1}$.

Figure 11:
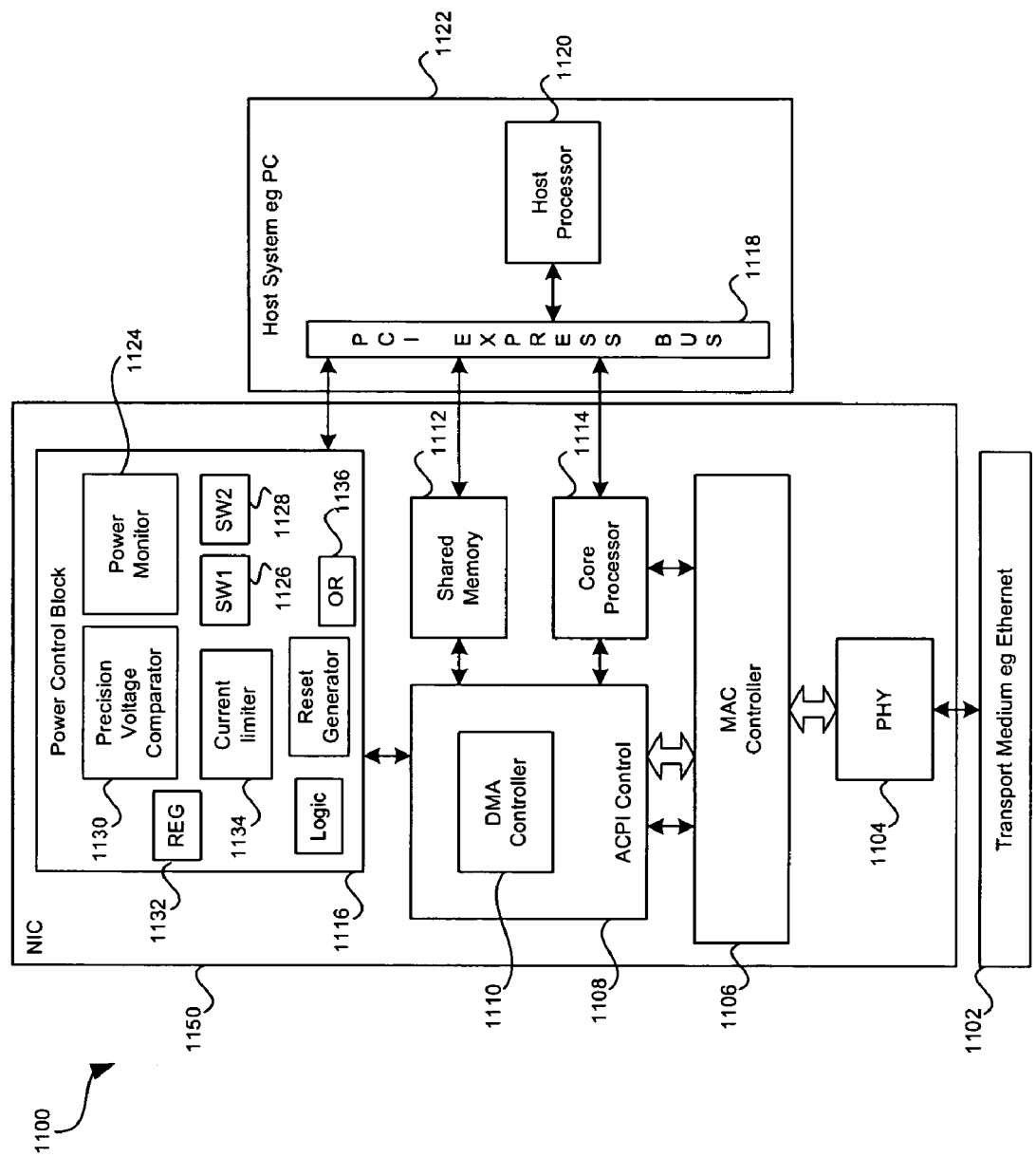
FIG. 11 is a block diagram of an exemplary system 1100 that may be utilized in connection with power management in a single chip networking device or other networking device in accordance with an embodiment of the invention.

FIG. 11 is a block diagram of an exemplary system 1100 that may be utilized in connection with power management in a single chip networking device or other networking device in accordance with an embodiment of the invention. Referring to FIG. 11, there is shown a transport medium 1102, a physical layer device (PHY) 1104, a MAC controller 1106, an advanced configuration and power interface (ACPI) control block 1108, a shared memory block 1112, a core processor 1114, power control block 1116, a bus 1118, and a host processor 1120 and host system 1122. The ACPI control block 1108 may include, for example a DMA controller 1110, and other functional component blocks. The physical layer device (PHY) 1104, the MAC controller 1106, the advanced configuration and power interface (ACPI) control block 1108, the shared memory block 1112, the core processor 1114, and the power control block 1116 may be integrated on a network interface card. The host system 1122 may be a personal computer and the bus 1118 may be part of the personal computer. In this regard, the network interface may be plugged into the bus 1118 of the personal computer.

The transport medium 1102 may be an optical medium, electrical medium or a combination thereof. The PHY 1104 may be gigabit PHY device which may be utilized for high speed communication at rates of the order of gigabits. The MAC controller 1106 may be adapted to handle MAC layer functions. The MAC layer functions are handled by the MAC controller 1106 may be part of the data link layer, layer 2, functions. In this regard, MAC controller 1106 may be configured to implement, for example, the IEEE 802.11ae Gigabit Ethernet protocol.

The ACPI control block 1108, may be adapted to conform with the advanced configuration and power interface (ACPI) specification. The ACPI block 1108 may be coupled to the MAC controller 1106, the core processor 1114, the shared memory 1112 and the power control block 1116. The ACPI control block 1108 may contain suitable logic and/or circuitry that may be adapted to generate events and control transition between various power management states. In one aspect of the invention, the ACPI control block 1108 may be implemented as a finite state machine (FSM), although the invention is not so limited.

The DMA Controller 1110 may be any suitable direct memory access processor or controller that may be adapted to control read and write processes to the shared memory 1112. The shared memory block 1112 may be any dual port random access memory (DPRAM). The shared memory block may include one or more high speed memory devices that may be capable of handling the processing of data at Gigabit speeds. The shared memory block 1112 may be memory mapped to facilitate access by one or more devices.

The core processor 1114 may be any of a general class of microcontrollers or microprocessors and may be a standalone processor device or an embedded processor device such as a system-on-chip processor (SoC). One or more functions or applications may be executed by the core processor 1114. For example, these functions or applications may be adapted to control the setting and clearing of the power management event status.

The bus 1118 may be any suitable bus, for example, a PCI, PCI-X, PCI Express (New Card), CardBus, Firewire or SCSI. The bus 1118 may be adapted to provide interconnectivity for a plurality of devices coupled thereto. Accordingly, an arbitration and/or prioritization scheme may be provided to grant access to the bus by the various devices coupled to the bus. For example, an interrupt driven scheme may be utilized to grant bus access and/or provide inter-device communication.

The host processor 1120 may be coupled to the bus 1118. The host processor 1120 may be any of a class of general or special purpose microprocessors or microcontrollers that may be adapted to communicate with one or more devices that may be coupled to the bus 1118. One or more applications or functions may be executed by the host processor 1120. An operating system may be executed by the host processor 1120. Additionally, one or more software applications may be adapted to receive and process power management events such as power management events for a particular device coupled to the bus 1118, or for the host system. The shared memory block 1112 may be memory mapped to a memory space of the host processor 1120 in order to facilitate data access and transfer. A power management event handler may be implemented as a software application.

The power control block 1116 is similar to the power control system of FIG. 4A. In this regard, the power control block 1116 may comprise a power monitor 1124, a first switch 1126, a second switch 1128, a precision voltage comparator 1130, a power control register 1132, a current limiter 1134 and an OR gate or function block 1136. The power control block 1116 may be coupled to the ACPI block 1108 and may be adapted to generate various power management events to one or more devices coupled to the bus 1118. The first switch 1126 may be a main voltage source switch and the second switch 1128 may be an auxiliary voltage source switch. The auxiliary power source switch 1128 may comprise a first FET coupled to a second FET and the main power source switch 1126 may comprise a third FET.

The system 1100 may be utilized to control power for the network interface card (NIC) 1150 in accordance with various aspects of the invention. The precision voltage comparator 1130 that may instantaneously detect ramp up of a main voltage corresponding to a main voltage source in order to control the network interface card 1150. The power monitor 1124 may detect when a threshold voltage of the main voltage is reached during the ramp up of the main voltage. The main voltage source switch 1126 and an auxiliary voltage source switch 1128 may switch an output from an auxiliary voltage to the main voltage source without the auxiliary voltage source switch 1128 and the main voltage source switch 1126 being simultaneously on. The power monitor 1124 may determine whether the main voltage is ramping up in excess of a determined rate and if so, the power monitor 124 may decrease a rate at which the main voltage ramps up if the main voltage is ramping up in excess of the determined rate. The current limiter 1134 and/or the power monitor 1124 may monitor an inrush current caused by the ramp up of the main voltage. The current limiter 1134 may accordingly limit the inrush current to less than about 375 mA.

The OR gate 1136 and/or the precision voltage comparator 1130 may cause generation of a reset signal that resets the core processor 1112 for the network interface card 1150 if the inrush current is greater than 375 mA. The power monitor 1124 may be adapted to delay switching from the auxiliary voltage source to the main voltage source. The power monitor 1124 may also disable turn on of the switch 1128 controlling the auxiliary voltage source and/or the switch 1126 controlling the main voltage source prior to reaching the threshold voltage. An OR gate and/or the precision voltage comparator may generate a reset signal, and the reset signal may be utilized to reset at least a core processor of the network interface controller device. The OR gate 1136 and/or the precision voltage comparator 1130 may be utilized to generate the reset signal whenever power down of the main power source is detected. The threshold voltage may be of the order of about 2.7V. The precision voltage comparator 1130 may adjust a reference voltage threshold in increments of about 100 mV in order to detect changes in the main voltage source. The power monitor 1124 may also be utilized to detect ramp down of the main voltage. Accordingly, the auxiliary power source switch 1128 and the main power source switch 1126 may switch the output from the main voltage source to the auxiliary voltage source without causing the auxiliary power source switch 1128 and the main voltage source switch 1126 to be simultaneously on.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling power for a network interface controller device, the method comprising:
   instantaneously detecting a ramp up of a main voltage corresponding to a main voltage source;
   detecting when a threshold voltage of said main voltage is reached during said ramp up of said main voltage; and
   switching an output from an auxiliary voltage source to said main voltage source without causing a switch controlling said auxiliary voltage source and a switch controlling said main voltage source to be simultaneously on, if said threshold voltage is reached.

2. The method according to claim 1, comprising determining whether said main voltage is ramping up in excess of a determined rate.

3. The method according to claim 2, comprising, if said main voltage is ramping up in excess of said determined rate, decreasing a rate at which said main voltage ramps up.

4. The method according to claim 1, comprising monitoring an inrush current caused by said ramp up of said main voltage.

5. The method according to claim 4, comprising limiting said inrush current to less than about 375 mA.

6. The method according to claim 4, comprising resetting at least a core processor for the network interface controller device, if said inrush current is greater than 375 mA.

7. The method according to claim 1, comprising delaying switching from said auxiliary voltage source to said main voltage source.

8. The method according to claim 1, comprising disabling turn on of at least one of said switch controlling said auxiliary voltage source and said switch controlling said main voltage source prior to reaching said threshold voltage.

9. The method according to claim 1, comprising generating a reset signal that resets at least a core processor of the network interface controller device during said detecting of said ramp up of said auxiliary voltage.

10. The method according to claim 9, comprising generating said reset signal whenever power down of said main power source is detected.

11. The method according to claim 1, wherein said threshold voltage is about 2.7V.

12. The method according to claim 1, comprising adjusting a reference voltage threshold in increments of about 100 mV in order to detect changes in said main voltage source.

13. The method according to claim 1, comprising detecting ramp down of said main voltage.

14. The method according to claim 13, comprising switching said output from said main voltage source to said auxiliary voltage source without causing a switch controlling said auxiliary voltage source and a switch controlling said main voltage source to be simultaneously on.

15. A machine-readable storage having stored thereon, a computer program having at least one code section for controlling power for a network interface controller device, the at least one code section being executable by a machine for causing the machine to perform steps comprising:
   instantaneously detecting a ramp up of a main voltage corresponding to a main voltage source;
   detecting when a threshold voltage of said main voltage is reached during said ramp up of said main voltage; and
   switching an output from an auxiliary voltage source to said main voltage source without causing a switch controlling said auxiliary voltage source and a switch controlling said main voltage source to be simultaneously on, if said threshold voltage is reached.

16. The machine-readable storage according to claim 15, comprising code for determining whether said main voltage is ramping up in excess of a determined rate.

17. The machine-readable storage according to claim 16, comprising code for decreasing a rate at which said main voltage ramps up, if said main voltage is ramping up in excess of said determined rate.

18. The machine-readable storage according to claim 15, comprising code for monitoring an inrush current caused by said ramp up of said main voltage.

19. The machine-readable storage according to claim 18, comprising code for limiting said inrush current to less than about 375 mA.

20. The machine-readable storage according to claim 18, comprising code for resetting at least a core processor for the network interface controller device, if said inrush current is greater than 375 mA.

21. The machine-readable storage according to claim 15, comprising code for delaying switching from said auxiliary voltage source to said main voltage source.

22. The machine-readable storage according to claim 15, comprising code for disabling turn on of at least one of said switch controlling said auxiliary voltage source and said switch controlling said main voltage source prior to reaching said threshold voltage.

23. The machine-readable storage according to claim 15, comprising code for generating a reset signal that resets at least a core processor of the network interface controller device during said detecting of said ramp up of said auxiliary voltage.

24. The machine-readable storage according to claim 23, comprising code for generating said reset signal whenever power down of said main power source is detected.

25. The machine-readable storage according to claim 15, wherein said threshold voltage is about 2.7V.

26. The machine-readable storage according to claim 15, comprising code for adjusting a reference voltage threshold in increments of about 100 mV in order to detect changes in said main voltage source.

27. The machine-readable storage according to claim 15, comprising code for detecting a ramp down of said main voltage.

28. The machine-readable storage according to claim 27, comprising code for switching said output from said main voltage source to said auxiliary voltage source without causing a switch controlling said auxiliary voltage source and a switch controlling said main voltage source to be simultaneously on.

29. A system for controlling power for a network interface controller device, the system comprising:
a precision voltage comparator that instantaneously detects a ramp up of a main voltage corresponding to a main voltage source;
a power monitor that detects when a threshold voltage of said main voltage is reached during said ramp up of said main voltage; and
a main voltage source switch and an auxiliary voltage source switch that switches an output from an auxiliary voltage to said main voltage source without either of said auxiliary voltage source switch and said main voltage source switch being simultaneously on, if said threshold voltage is reached.

30. The system according to claim 29, wherein said power monitor determines whether said main voltage is ramping up in excess of a determined rate.

31. The system according to claim 30, wherein said power monitor decreases a rate at which said main voltage ramps up, if said main voltage is ramping up in excess of said determined rate.

32. The system according to claim 29, comprising a current limiter, wherein at least one of said current limiter and said power monitor monitors an inrush current caused by said ramp up of said main voltage.

33. The system according to claim 32, wherein said current limiter limits said inrush current to less than about 375 mA.

34. The system according to claim 32, comprising at least one OR gate, wherein at least one of said OR gate and said precision voltage comparator causes generation of a reset signal and said reset signal resets at least a core processor for the network interface controller device if said inrush current is greater than 375 mA.

35. The system according to claim 29, wherein said power monitor delays switching from said auxiliary voltage source to said main voltage source.

36. The system according to claim 29, wherein said power monitor disables turn on of at least one of said switch controlling said auxiliary voltage source and said switch controlling said main voltage source prior to reaching said threshold voltage.

37. The system according to claim 29, comprising an OR gate, wherein one or both of said OR gate and/or said precision voltage comparator generates a reset signal, and wherein said reset signal resets at least a core processor of the network interface controller device during said detecting of said ramp up of said auxiliary voltage.

38. The system according to claim 37, wherein said one or both of said OR gate and/or said precision voltage comparator generates said reset signal whenever power down of said main power source is detected.

39. The system according to claim 29, wherein said threshold voltage is about 2.7V.

40. The system according to claim 29, wherein said precision voltage comparator adjusts a reference voltage threshold in increments of about 100 mV in order to detect changes in said main voltage source.

41. The system according to claim 29, wherein said power monitor detects a ramp down of said main voltage.

42. The system according to claim 29, wherein said auxiliary power source switch and said main power source switch switches said output from said main voltage source to said auxiliary voltage source without causing said auxiliary power source switch and said main voltage source switch to be simultaneously on.

43. The system according to claim 29, wherein said auxiliary power source switch comprises a first FET coupled to a second FET.

44. The system according to claim 29, wherein said main power source switch comprises a third FET.

45. The method according to claim 1, wherein said network interface controller device is an integrated circuit.

46. The method according to claim 1, wherein said main voltage and said auxiliary voltage are each in a direct current (DC) mode.

47. The method according to claim 1, comprising monitoring said output of main voltage source and said output of auxiliary voltage source using a power monitor.

48. The method according to claim 1, comprising using a tri-state buffer to minimize glitching during switching of said output from said auxiliary voltage source to said main voltage source.

49. The method according to claim 14, comprising using a tri-state buffer to minimize glitching during switching of said output from said main voltage source to said auxiliary voltage source.

50. The machine-readable storage according to claim 15, wherein said network interface controller device is an integrated circuit.

51. The machine-readable storage according to claim 15, wherein said main voltage and said auxiliary voltage are each in a direct current (DC) mode.

52. The machine-readable storage according to claim 15, comprising code for monitoring said output of main voltage source and said output of auxiliary voltage source using a power monitor.

53. The machine-readable storage according to claim 15, comprising using a tri-state buffer to minimize glitching during switching of said output from said auxiliary voltage source to said main voltage source.

54. The machine-readable storage according to claim 28, comprising code for using a tri-state buffer to minimize glitching during switching of said output from said main voltage source to said auxiliary voltage source.

55. The system according to claim 29, wherein said network interface controller device is an integrated circuit.

56. The system according to claim 29, wherein said main voltage and said auxiliary voltage are each in a direct current (DC) mode.

57. The system according to claim 29, comprising monitoring said output of main voltage source and said output of auxiliary voltage source using a power monitor.

58. The system according to claim 29, comprising using a tri-state buffer to minimize glitching during switching of said output from said auxiliary voltage source to said main voltage source.

59. The system according to claim 42, comprising using a tri-state buffer to minimize glitching during switching of said output from said main voltage source to said auxiliary voltage source.

* * * * *